United States Patent
Ahmad et al.

(10) Patent No.: US 10,014,019 B2
(45) Date of Patent: *Jul. 3, 2018

(54) MEASUREMENT AND CORRECTION OF MAGNETIC WRITER OFFSET ERROR

(71) Applicant: International Business Machines Corporation, Armonk, NY (US)

(72) Inventors: Said A. Ahmad, Tucson, AZ (US); Ernest S. Gale, Tucson, AZ (US); David L. Swanson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/442,551

(22) Filed: Feb. 24, 2017

(65) Prior Publication Data

US 2017/0169845 A1 Jun. 15, 2017

Related U.S. Application Data

(63) Continuation of application No. 14/641,185, filed on Mar. 6, 2015, now Pat. No. 9,613,646.

(51) Int. Cl.
| | | |
|---|---|---|
| *G11B 5/584* | (2006.01) | |
| *G11B 20/12* | (2006.01) | |

(Continued)

(52) U.S. Cl.
CPC .......... *G11B 5/584* (2013.01); *G11B 5/00813* (2013.01); *G11B 5/00826* (2013.01); *G11B 20/1201* (2013.01); *G11B 20/18* (2013.01)

(58) Field of Classification Search
None
See application file for complete search history.

(56) References Cited

U.S. PATENT DOCUMENTS

| | | |
|---|---|---|
| 6,031,682 A | 2/2000 | Nelson |
| 6,906,888 B1 | 6/2005 | Trabert et al. |

(Continued)

FOREIGN PATENT DOCUMENTS

| | | |
|---|---|---|
| CN | 1909067 A | 2/2007 |
| CN | 103514886 A | 1/2014 |

(Continued)

OTHER PUBLICATIONS

Non-Final Office Action from U.S. Appl. No. 14/634,669, dated Jun. 2, 2017.

(Continued)

*Primary Examiner* — K. Wong
(74) *Attorney, Agent, or Firm* — Zilka-Kotab, P.C.

(57) ABSTRACT

A method, according to one embodiment, includes writing a plurality of shingled tracks using an array of writers. The array of readers is repositioned to various locations between first and second positions and data is read from the shingled tracks at the various locations. A read offset point where read performance is about the highest during the reading performed when repositioning the array of readers between the first and second positions is determined. The method includes computing, using the read offset point, data describing a lateral writing position to use during writing such that shingled tracks are written in a location specified by a format. As a result, methods according to the present embodiment are able to provide desirable track alignment and reduced readback error rates for data of shingled tracks written to magnetic medium.

18 Claims, 20 Drawing Sheets

(51) Int. Cl.
*G11B 5/008* (2006.01)
*G11B 20/18* (2006.01)

(56) References Cited

U.S. PATENT DOCUMENTS

| | | | |
|---|---|---|---|
| 7,116,514 | B2 | 10/2006 | Mahnad et al. |
| 7,193,812 | B2 | 3/2007 | Eaton |
| 7,253,988 | B2 | 8/2007 | Okafuji et al. |
| 8,154,811 | B2 | 4/2012 | Barsotti et al. |
| 8,264,918 | B2 | 9/2012 | Hashimoto et al. |
| 8,780,486 | B2 | 7/2014 | Bui et al. |
| 8,797,672 | B2 | 8/2014 | Tanabe et al. |
| 8,824,083 | B1 | 9/2014 | Kientz et al. |
| 8,856,618 | B2 | 10/2014 | Akiyama et al. |
| 8,896,961 | B1 | 11/2014 | Harllee, III |
| 8,976,482 | B2 | 3/2015 | Cherubini et al. |
| 9,117,470 | B1 | 8/2015 | Bui et al. |
| 9,129,631 | B1 | 9/2015 | Biskeborn et al. |
| 9,613,646 | B2 * | 4/2017 | Ahmad .................. G11B 5/584 |
| 9,911,443 | B2 | 3/2018 | Biskeborn et al. |
| 2013/0010388 | A1 | 1/2013 | Nonaka et al. |
| 2013/0083419 | A1 | 4/2013 | Springberg et al. |
| 2013/0201576 | A1 | 8/2013 | Grundvig |
| 2013/0265669 | A1 | 10/2013 | Hostetter |
| 2013/0286498 | A1 | 10/2013 | Haratsch et al. |
| 2014/0029133 | A1 | 1/2014 | Tagami et al. |
| 2014/0036383 | A1 | 2/2014 | Cideciyan et al. |
| 2014/0101515 | A1 | 4/2014 | Akiyama et al. |
| 2016/0254014 | A1 | 9/2016 | Biskeborn et al. |
| 2016/0260449 | A1 | 9/2016 | Ahmad et al. |
| 2018/0090162 | A1 | 3/2018 | Biskeborn et al. |

FOREIGN PATENT DOCUMENTS

| | | | |
|---|---|---|---|
| DE | 102013016147 | A1 | 4/2014 |
| GB | 2504192 | A | 1/2014 |
| GB | 2506495 | A | 4/2014 |

OTHER PUBLICATIONS

Liu, F. et al; "Effect of track asymmetry and curvature on shingle writing scheme," Journal of Applied Physics 109, 07B740, Mar. 31, 2011, pp. 1-3.
List of IBM Patents Or Patent Applications Treated As Related.
Biskeborn et al., U.S. Appl. No. 14/634,669, filed Feb. 27, 2015.
Non-Final Office Action from U.S. Appl. No. 14/641,185, dated May 21, 2015.
Ahmad et al., U.S. Appl. No. 14/641,185, filed Mar. 6, 2015.
Final Office Action from U.S. Appl. No. 14/641,185, dated Oct. 30, 2015.
Non-Final Office Action from U.S. Appl. No. 14/641,185, dated May 26, 2016.
Non-Final Office Action from U.S. Appl. No. 14/634,669, dated Sep. 13, 2016.
Notice of Allowance from U.S. Appl. No. 14/641,185, dated Nov. 17, 2016.
Final Office Action from U.S. Appl. No. 14/634,669, dated Feb. 3, 2017.
Notice of Allowance from U.S. Appl. No. 14/634,669, dated Oct. 20, 2017.
Supplemental Notice of Allowance from U.S. Appl. No. 14/634,669, dated Jan. 12, 2018.
Biskeborn et al., U.S. Appl. No. 15/826,525, filed Nov. 29, 2017.
Notice of Allowance from U.S. Appl. No. 15/826,525, dated Feb. 26, 2018.
Supplemental Notice of Allowance from U.S. Appl. No. 15/826,525, dated Mar. 20, 2018.
Office Action from Chinese Patent Application No. 201610124777.8, dated Apr. 2, 2018.
Supplemental Notice of Allowance from U.S. Appl. No. 15/826,525, dated Apr. 4, 2018.
Biskeborn et al., U.S. Appl. No. 15/952,061, filed Apr. 12, 2018.
Supplemental Notice of Allowance from U.S. Appl. No. 15/826,525, dated Apr. 30, 2018.

* cited by examiner

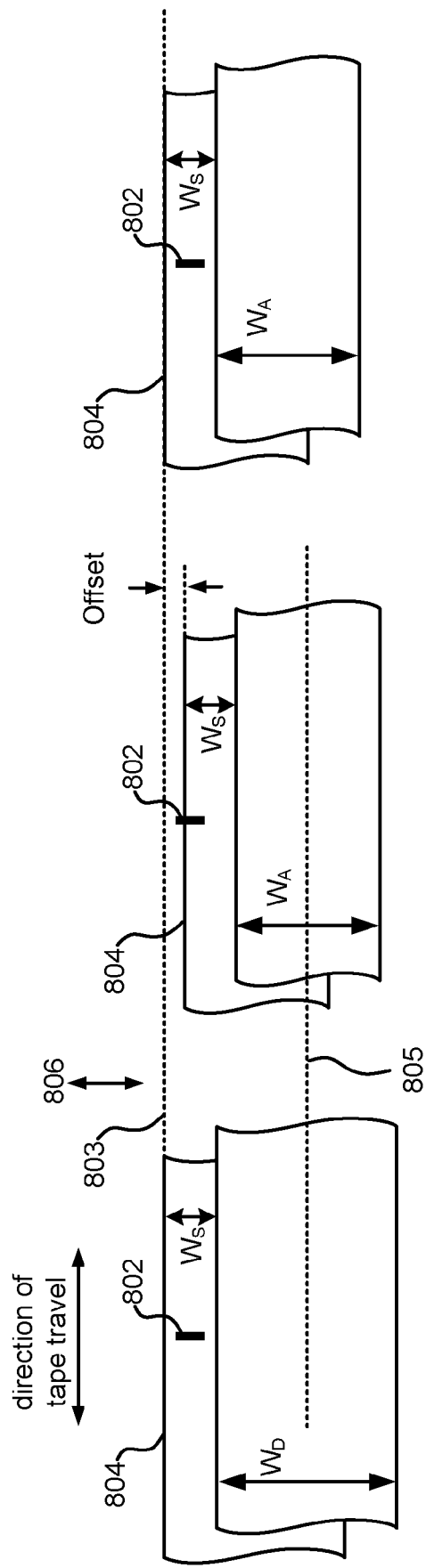

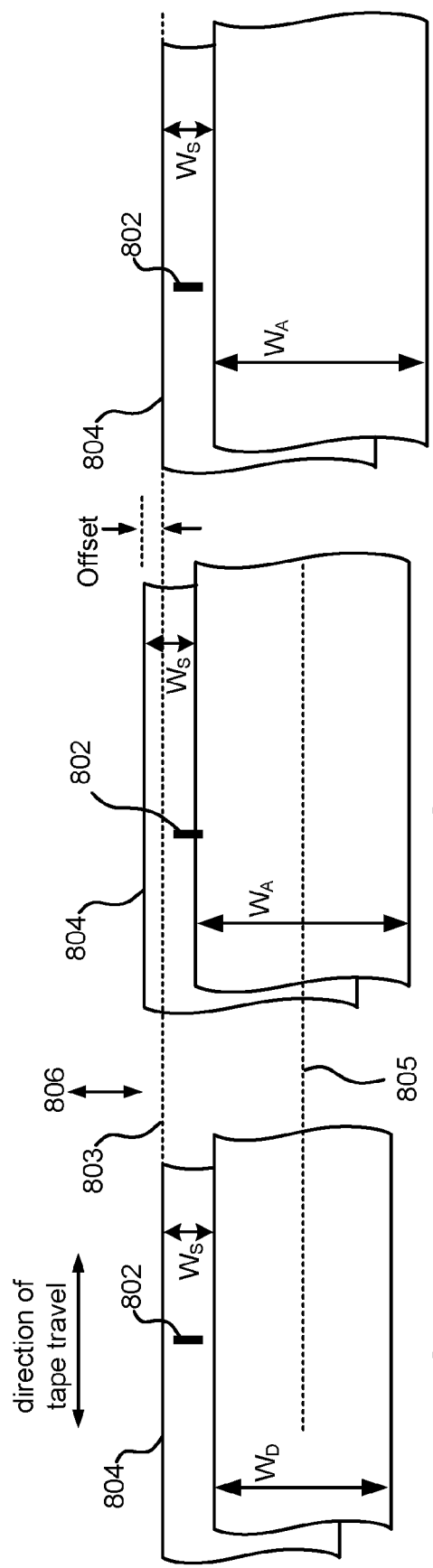

MEASUREMENT AND CORRECTION OF MAGNETIC WRITER OFFSET ERROR

BACKGROUND

The present invention relates to data storage systems, and more particularly, this invention relates to edge placement of written data to achieve aligned shingled writing.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be expanded by increasing the number of data tracks across the tape. Moreover, by overlapping portions of data tracks (e.g., shingling data tracks), improvements to data storage quantities are achieved.

BRIEF SUMMARY

A method, according to one embodiment, includes writing a plurality of shingled tracks using an array of writers. The array of readers is repositioned to various locations between first and second positions and data is read from the shingled tracks at the various locations. A read offset point where read performance is about the highest during the reading performed when repositioning the array of readers between the first and second positions is determined. The method includes computing, using the read offset point, data describing a lateral writing position to use during writing such that shingled tracks are written in a location specified by a format.

A computer program product, according to another embodiment, includes a computer readable storage medium having program instructions embodied therewith, the program instructions executable by a controller to cause the controller to perform the foregoing method.

A magnetic recording product for storing data, according to one embodiment, includes a linear magnetic recording medium, and a reserved region on the magnetic recording medium, the reserved region being configured to receive shingled tracks usable for determining a lateral writing position to use during writing such that shingled tracks are written in a location specified by a format.

Any of these embodiments may be implemented in or with a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 8A-8F are partial representational views of shingled data tracks according to different embodiments.

DETAILED DESCRIPTION

Figure 1A:
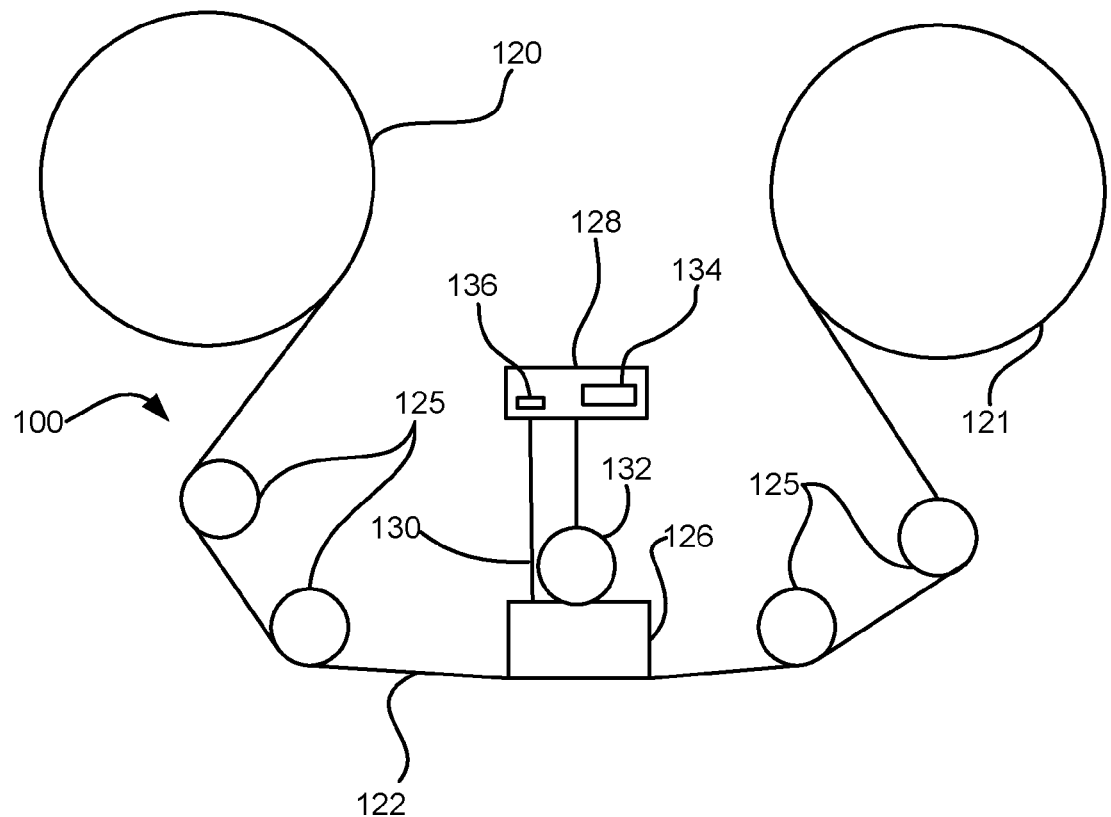
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. For example, various embodiments enable determination of a lateral writing position to use during writing shingled data tracks. This causes the shingled tracks to be positioned in the proper location on the recording medium according to a desired format, which in turn improves readback reliability.

In one general embodiment, a method includes writing a plurality of shingled tracks using an array of writers, determining first and second positions of an array of readers relative to the shingled tracks, the first and second positions being above and/or beyond track edges of the shingled tracks, repositioning the array of readers to various locations between the first and second positions and reading data from the shingled tracks, determining a read offset point where read performance is about the highest during the reading performed when repositioning the array of readers between the first and second positions, and computing, using the read offset point, data describing a lateral writing position to use during writing such that shingled tracks are written in a location specified by a format.

In another general embodiment, a magnetic recording product for storing data includes a linear magnetic recording medium, and a reserved region on the magnetic recording medium near a first end of the linear magnetic recording medium, the reserved region being configured to receive shingled tracks usable for determining a lateral writing position to use during writing such that shingled tracks are written in a location specified by a format.

In yet another general embodiment, a computer program product includes a computer readable storage medium having program instructions embodied therewith, the program instructions executable by a controller to cause the controller to perform a method which includes: writing, by the controller, a plurality of shingled tracks using an array of writers, determining, by the controller, first and second positions of an array of readers relative to the shingled tracks, the first and second positions being above and/or beyond track edges of the shingled tracks, repositioning, by the controller, the array of readers between the first and second positions and reading data from the shingled tracks, determining, by the controller, a read offset point where read performance is about the highest during the reading performed when repositioning the array of readers between the first and second positions, and computing, by the controller using the read offset point, data describing a lateral writing position to use during writing such that shingled tracks are written in a location specified by a format.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
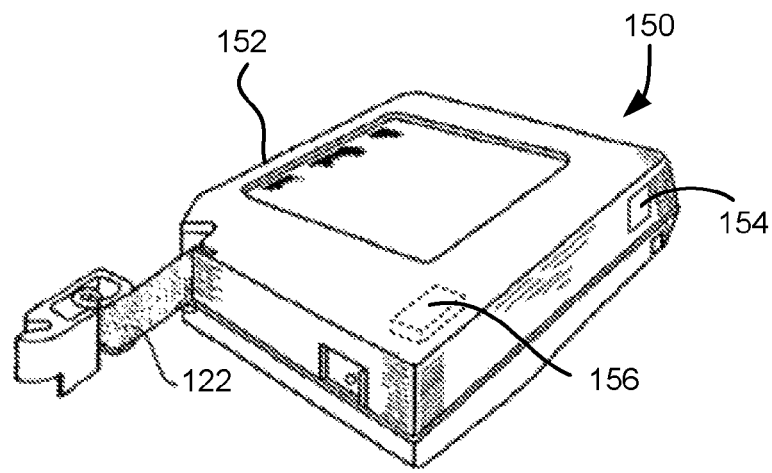
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
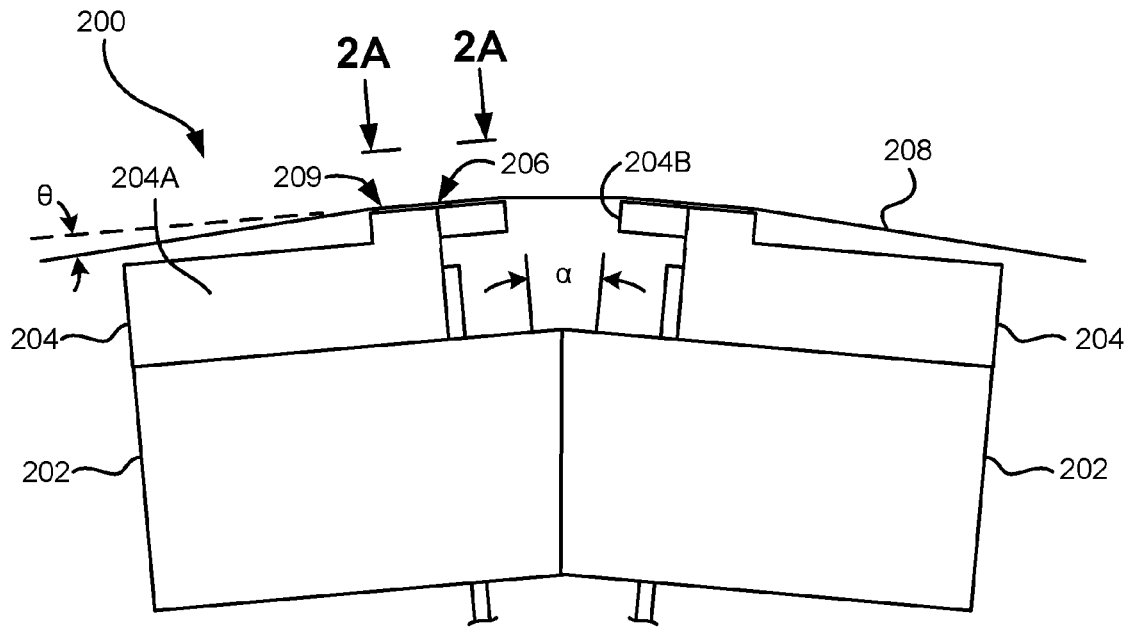
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B are made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
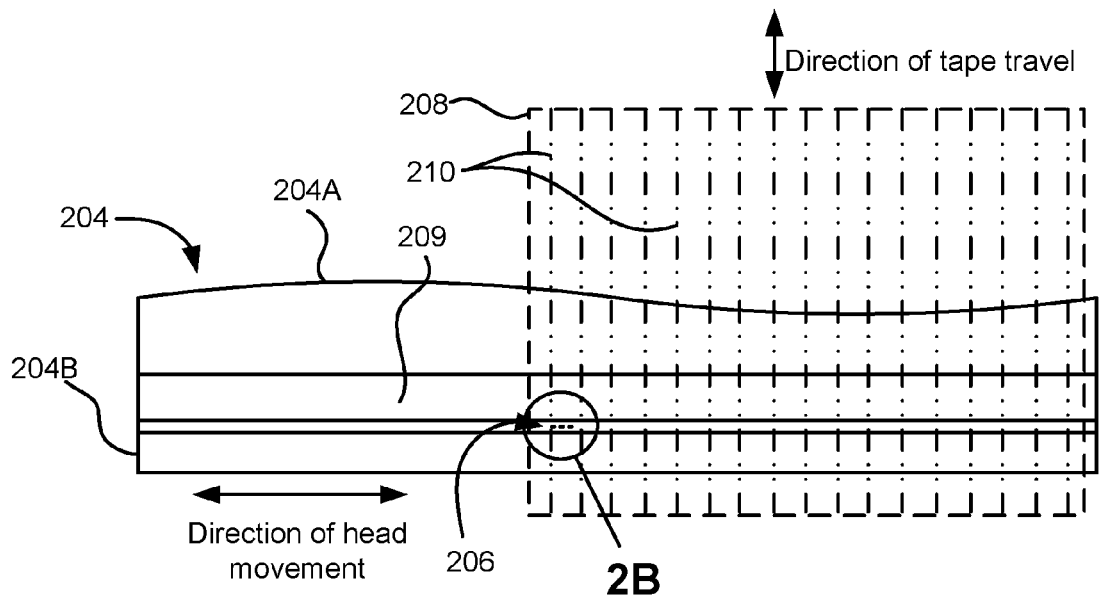
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
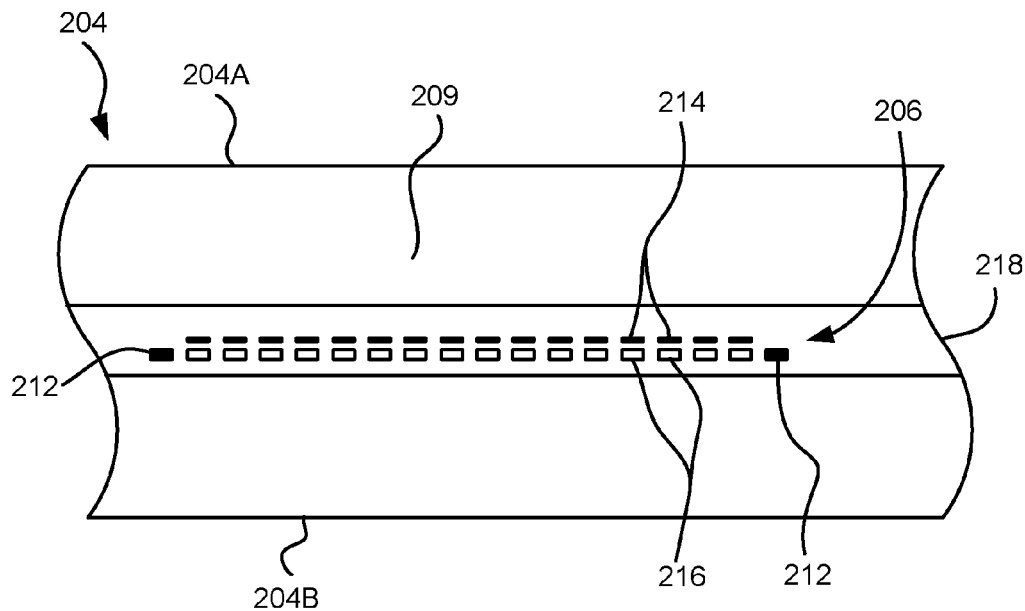
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
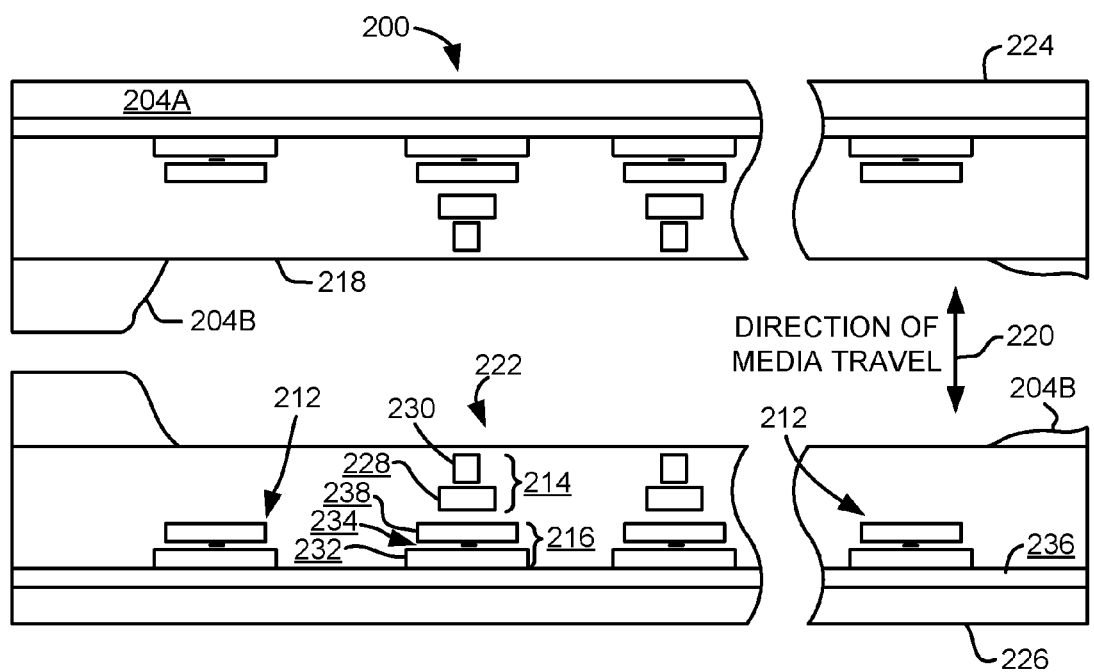
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
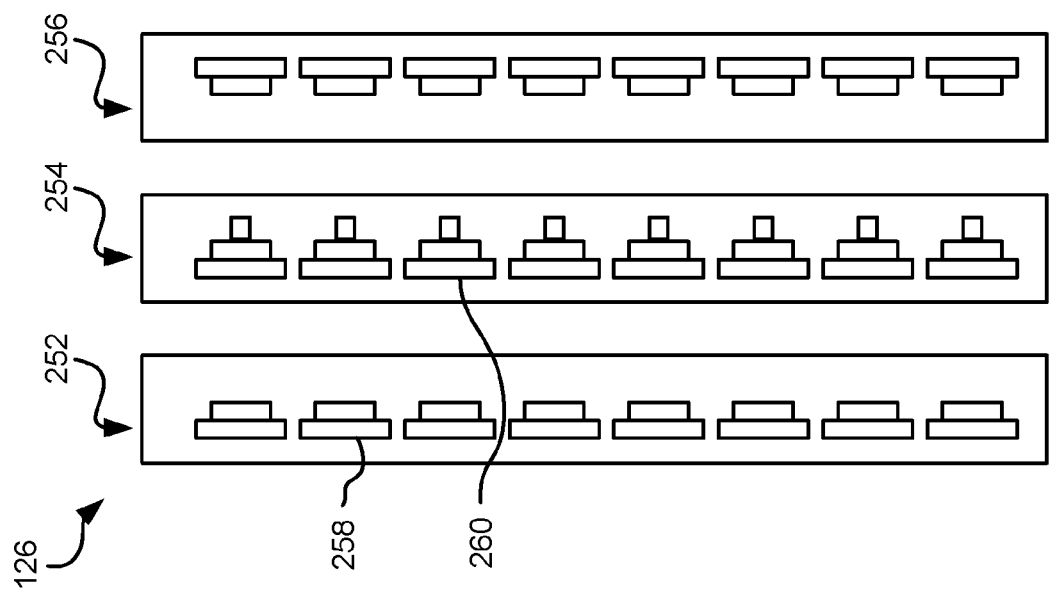
FIG. 4 is a partial tape bearing surface view of a magnetic head having a read-write-read configuration.
Figure 3:
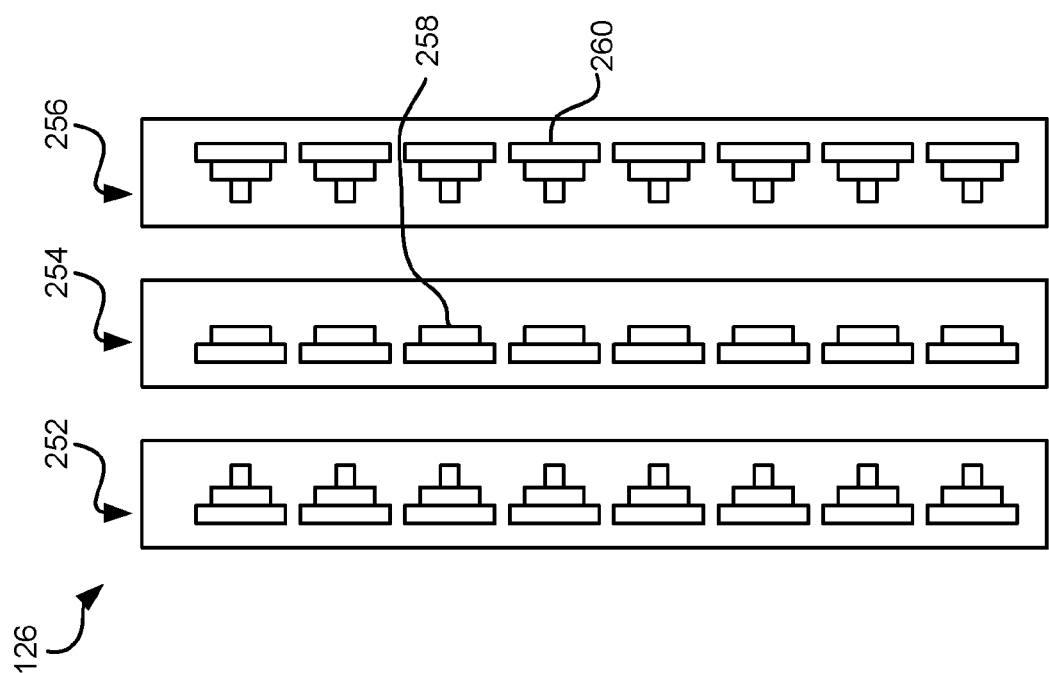
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
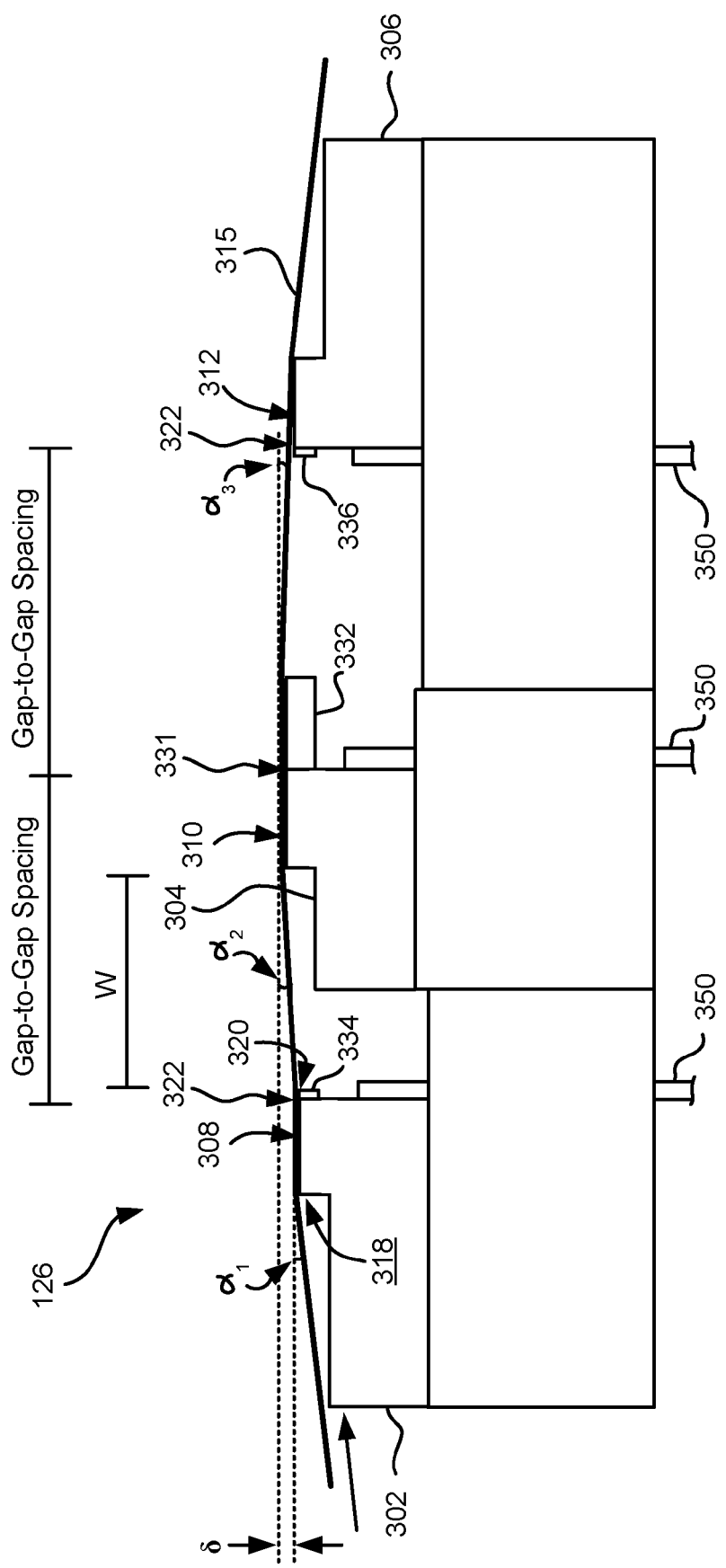
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
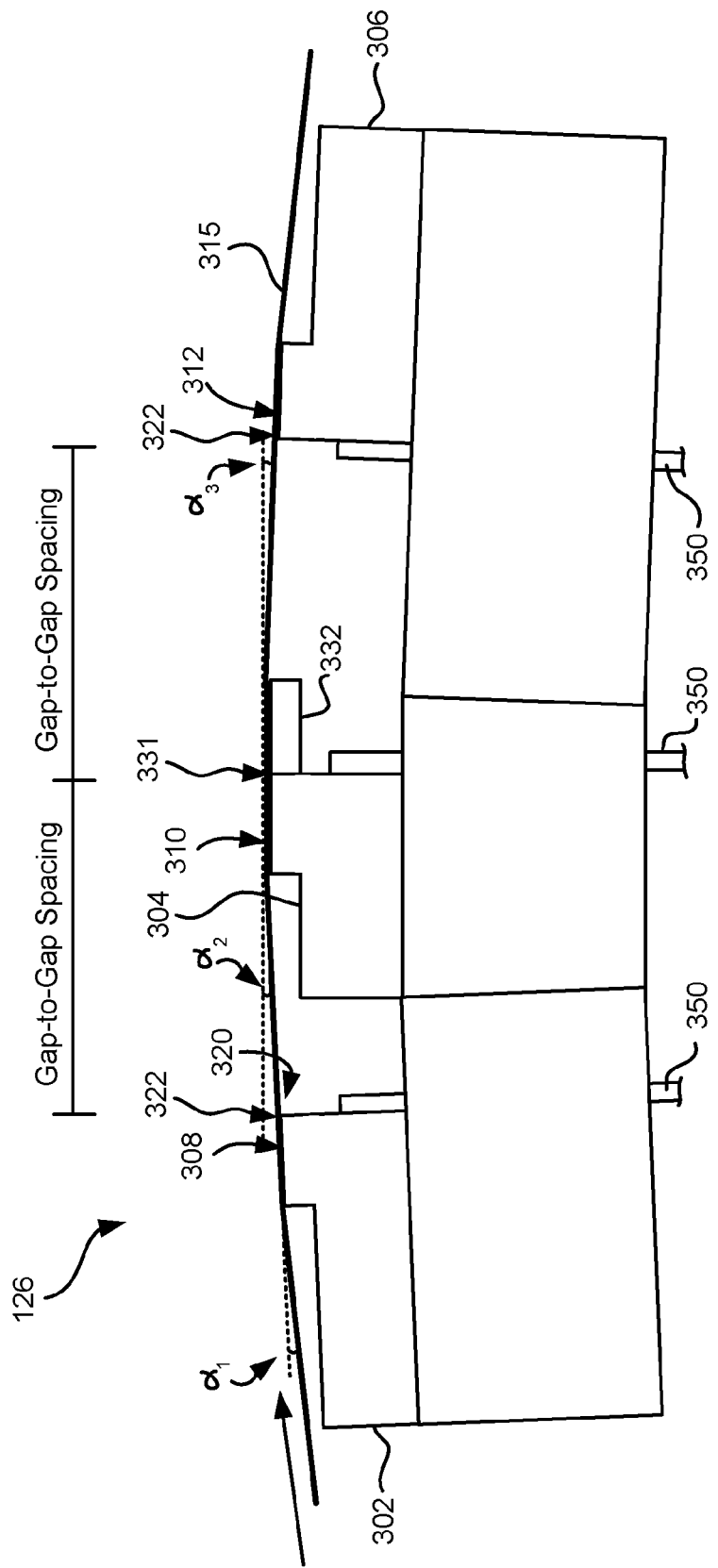
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
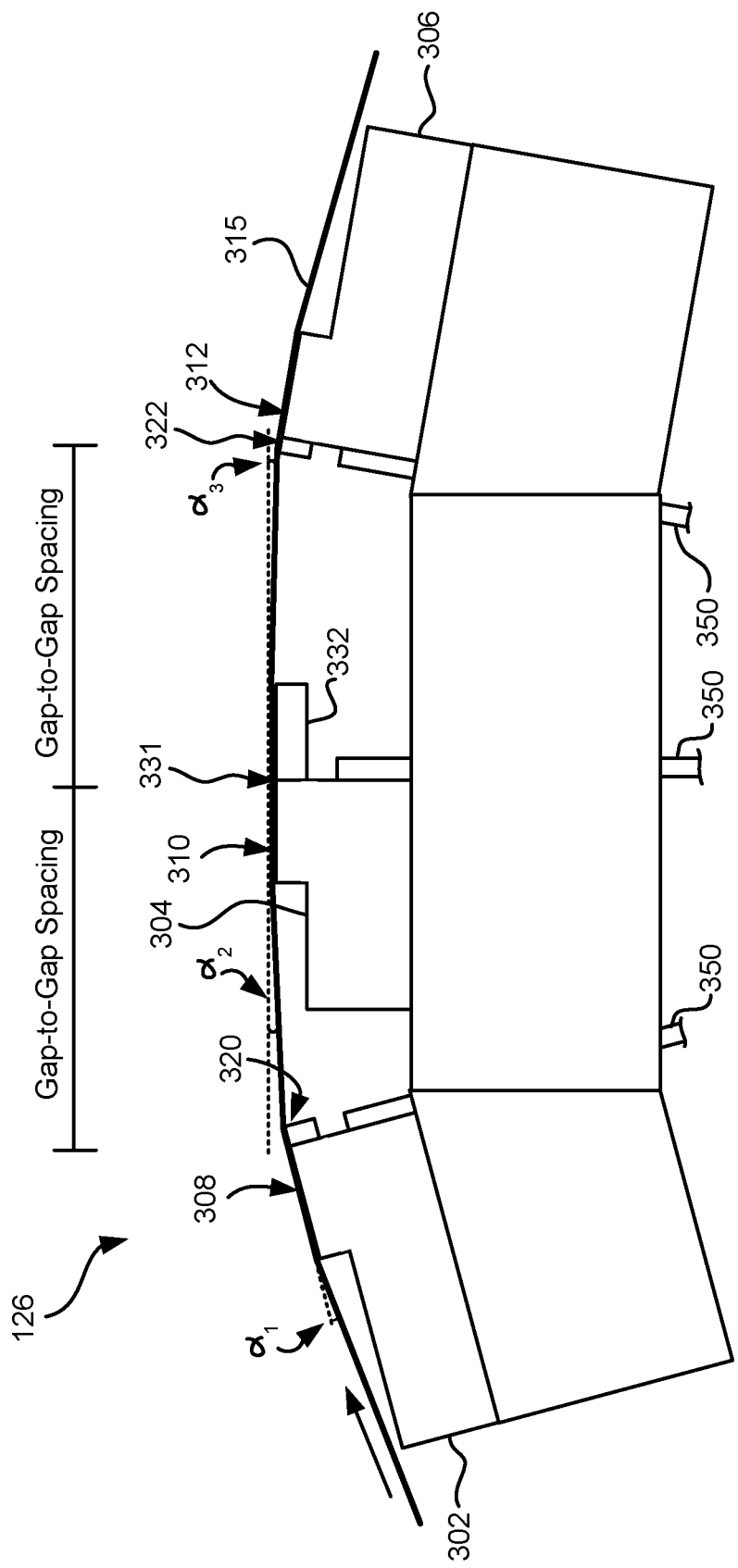
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As previously mentioned, the quantity of data stored on a magnetic tape may be expanded by overlapping portions of data tracks (e.g., shingling data tracks) and thereby increasing the number of data tracks across the tape. Shingling may be used to adjust written track width for writing narrower tracks using wider legacy writers which enable so called backward compatibility. As a result, improvements to data storage quantities are achieved. However, these improvements to data storage quantities may come at the expense of readback performance in conventional products. Specifically, conventional products may experience a decline in readback performance resulting from a degree of uncertainty with regard to the writer characteristics, and therefore, the characteristics of the tracks written by the writers.

As written track widths have decreased, write head irregularities tend to have more of an impact on writing performance. Thus, the errors experienced due to these write head irregularities have increased to a point where they have a significant (e.g., measurable) effect on drive performance and manufacturing yield. In particular, the "side-writing" effect (a situation where a stripe on either side of the written track effectively erases the underlying data) causes track misplacement when combined with the implementation of shingled writing.

For example, the actual dimensions and/or position of one or more writers in a head may be different than the nominal design dimensions and/or position of the one or more writers. This discrepancy between actual and nominal design characteristics of writers may result in a displacement of the edges of shingled tracks when written to media. The drive attempts to read back the shingled tracks in the nominal design reading position, but depending on the extent which shingled tracks are displaced from the nominal design position, the shingled tracks may cause increased readback errors and/or may not be readable at all. Although error recovery operations may be able to counteract some of this undesirable effect, relying on error recovery procedures to temporarily solve known written-in offsets can introduce a great deal more back-and-forth tape motion (such as backhitching) and/or create more permanent error conditions. In either case, read margin is reduced in general operation, thereby creating a higher likelihood of additional problems being experienced in error recovery.

FIGS. 8A-8C illustrate the difference which may exist between nominal design and actual characteristics (e.g., dimensions, positioning, etc.) of shingled tracks, respectively. FIG. 8A depicts the nominal design characteristics of shingled tracks to be written to tape based on the nominal design characteristics of the writers used to write the shingled tracks. Conceptually, this is what is what is expected to occur in use. As shown, the reader 802 is designed to be oriented at a position anticipated to align with the written track 804 on tape as the tape moves in the direction of tape travel relative to the reader 802. The dashed line 803 depicts the expected edge of the shingled track 804, e.g., according to a format.

However, due to thin film wafer processing variations, the actual dimensions of the writer may be different than the design specifications, even though the writer dimensions fall within tolerances. It follows that the positions of the edges of the shingled tracks may differ from the nominal design, thereby potentially resulting in causing reader misalignment with tracks and even spanning onto adjacent tracks.

For example, as represented in FIGS. 8A and 8B, when the actual writer width is less than the nominal design writer width, the actual width $W_A$ of the physical track is narrower than the design width $W_D$, which causes the characteristics of the written tracks 804 on tape in FIG. 8B to be different than the nominal design characteristics of the tracks, as depicted in FIG. 8A. Particularly, though the centerlines 805 of the written (pre-shingled) tracks remains the same, and the width $W_S$ of the shingled track is the same in FIGS. 8A and 8B, the upper edge of the shingled track 804 in FIG. 8B is offset (Offset) from the expected location along line 803 in the cross-track direction 806 due to the narrower actual writer width. The drive code positions the reader 802 in the center of the nominal shingled track position as depicted in FIG. 8A. Accordingly, a significant portion the reader 802 is outside of the shingled track 804 despite being oriented at a position anticipated to align with nominal design characteristics of the written track 804.

As discussed in more detail below, various embodiments may be used to determine the presence and/or extent of differences between the characteristics of tracks written on tape and the nominal design characteristics of the tracks. For example, some embodiments introduced below may be used to determine the approximate location of the track edges of shingled tracks written on tape (e.g., see FIGS. 13A-13B). Moreover, upon determining the approximate location of the track edges of the shingled tracks, a laterally corrected writing position may be computed, and preferably applied, to minimize misregistration during readback at nominal locations, thereby enabling writing of the readable portions of the shingled tracks in locations that correspond to the nominal design position. Then, when a drive performs a readback operation, the reader is positioned properly above the shingled tracks. FIG. 8C depicts a shingled track 804 written with the corrected lateral writing position applied to minimize the reader misregistration. Moreover it is preferred that a laterally corrected writing position is computed, and preferably applied, to each drive individually, e.g., to address drive-to-drive variations.

As a result, it is desirable that the discrepancies between nominal design characteristics of shingled tracks and actual characteristics of shingled tracks are mitigated. Furthermore, by improving matching between nominal design characteristics and actual characteristics in tape drive environments, significant improvements in manufacturing yield may also be achieved. It should be noted that although the offset is illustrated in FIGS. 8A-8C as being measured using an outside edge of the data tracks, according to other approaches, an offset may be measured using a center point of the data tracks, or any other desired reference point.

Similarly, FIGS. 8D-8F, having common numbering with FIGS. 8A-8C for similar components, depict the case where the actual writer width is greater than the design width. FIG. 8D illustrates the design width $W_D$ of a (pre-shingled) track as written. FIG. 8E illustrates the effect that occurs when the actual writer width is larger than the design writer width, thereby causing the edge of the shingled track 804 to be displaced from the nominal design location along line 803. Various embodiments correct the writing position to minimize the displacement, thereby enabling writing of shingled tracks in the intended position specified by the nominal design. Then, when a drive performs a readback operation, the reader is positioned properly above the shingled tracks. FIG. 8F depicts a shingled track 804 written with the corrected writing position applied to minimize the reader misregistration.

The repositioning of readers was contemplated in order to reduce readback error rates, but was deemed impractical for removable media which may have data appended by multiple drives, each having a different shingled track placement error and thus requiring a different read head repositioning requirement. Similarly, attempts to budget and thereby compensate for undesirable positioning of shingled tracks were found to result in lower achievable areal density. Finally, reducing the reader width was deemed undesirable as resulting in lower readback amplitude broadband signal to noise ratio.

Accordingly, various embodiments described herein enable accurate and optimal implementations of shingled writing on magnetic media. By considering the nominal design and actual characteristics of the writers and/or written tracks, accurate and predictable and optimal characteristics of the shingled tracks written to media may be achieved. Accordingly, a given medium may, in some embodiments, be accurately read in any one of a plurality of drives without making significant adjustments to the read head position between drives, as will be described in further detail below.

Figure 9:
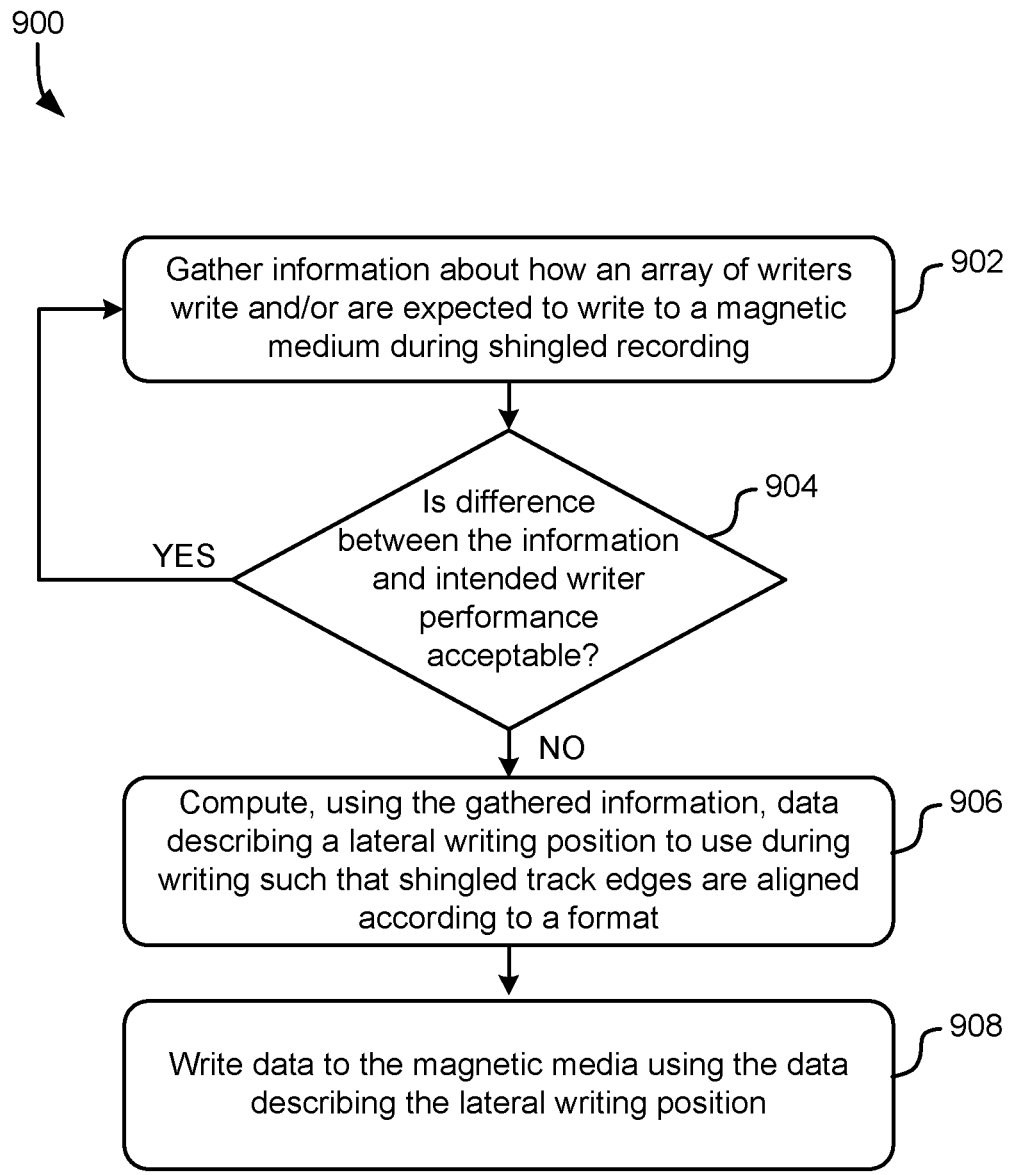
FIG. 9 is a flowchart of a method according to one embodiment.

Now referring to FIG. 9, a flowchart of a method 900 is shown according to one embodiment. The method 900 may be performed in any of the environments depicted in FIGS. 1-7, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a controller (e.g., see 128 of FIG. 1A), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 includes operation 902, where information about how an array of writers actually write and/or are expected to write to a magnetic medium during shingled recording is gathered. Again, differences between how writers are intended to write to a magnetic medium, and how writers actually write and/or are expected to write to the magnetic medium result in degraded readback performance. Thus, by gathering information about how an array of writers actually write and/or are expected to write to a magnetic medium as seen in operation 902, such information may be used to improve the readback performance, e.g., by implementing a lateral writing position which is laterally shifted from what would otherwise be a nominal actual writing position to compensate for any discrepancies between actual and nominal design writer characteristics, as will soon become apparent.

According to some embodiments, the information gathered in operation 902 may be used to determine the approximate location of the outer extents (e.g., track edges) of shingled tracks written by an array of writers. As previously mentioned, the actual characteristics of an array of writers may vary from the nominal designs thereof. Therefore, the actual characteristics of the array of writers may be unknown at a point after the writers have been formed, yet before they have been inspected. Thus, the location of shingled track edges written using the writers may initially be unknown. For example, referring again momentarily to FIGS. 8A-8B and 8D-8E, the offset (Offset) between the track edges of the shingled tracks 804 may be unknown prior to examining the physical track. However, upon determining the actual location of the shingled track edges written using an array of writers (e.g., by implementing one or more of the operations of method 1300 below), a lateral writing position which is laterally shifted from what would otherwise be a nominal actual writing position may be determined, which preferably compensates for any discrepancies between actual and nominal design characteristics of the array of writers.

However, in some embodiments, the information gathered in operation 902 may indicate that nominal design and actual characteristics of the writers are matched, e.g., a difference between the nominal design and actual characteristics of the writers is within a tolerance. Thus, in some embodiments an array of writers may write data tracks having characteristics which sufficiently match nominal design characteristics thereof. With continued reference to method 900, optional decision 904 includes determining whether a difference between actual writer performance and nominal design writer performance is acceptable, e.g., within an acceptable range, less than some predefined value delineating acceptable performance from unacceptable performance, etc. In response to determining that the difference is acceptable, method 900 may end, or proceed to operation 902 such that information about how another array of writers is writing may be gathered, e.g., the writers on an opposing module. Accordingly, data may be written and efficiently read without implementing a lateral writing position. It follows that in some approaches, application of an offset to the nominal lateral writing position may be disengaged by such determination, by user override, waived upon detecting a predetermined condition, etc.

Alternatively, upon determining that a difference between actual writer performance and nominal design writer performance is not acceptable, method 900 proceeds to operation 906 which includes using the gathered information to compute data describing an offset lateral writing position to use during writing such that shingled track edges are aligned according to a format. For example, the data describing the lateral writing position may represent a lateral offset to apply to a nominal writing position during writing operations, e.g., resulting in the transitions of writing positions from FIGS. 8B to 8C and 8E to 8F. The lateral writing position may be based, at least in part, on a lateral offset between nominal design and actual characteristics of writers and/or data tracks written by writers. In other words, implementing a computed lateral writing position during writing desirably overcomes any discrepancies (e.g., lateral misregistrations) between the nominal design and actual characteristics of the writers. As a result, in operation 908, data may be written to magnetic media (e.g., tape) by using the data describing the lateral writing position, e.g., by applying an offset to the nominal writing position. This solution may enable different drives to accurately read the data, without having to attempt to compensate for shingled track edge offsets by repositioning the reading position away from nominal, because the data is written in the correct position from the outset.

In addition, according to some approaches, the lateral writing position may be further adjusted to compensate for additional track characteristics, e.g., to avoid and/or compensate for curved edges of the magnetic transitions which form along the edges of the data tracks. According to an example, the lateral writing position may be laterally repositioned by about an additional 2-10% of the shingled track width towards the curved edges of the magnetic transitions of the track being read, or vice versa. Thus, in some embodiments, the readable portion of written tracks may be reduced by the extent of the curved portion. In this case, the "edge" of the shingled track may refer to the edge of the properly written portion.

According to some embodiments, the data describing a lateral writing position may be computed once for every drive, e.g., at a point of manufacture. For example, a drive carcass (e.g., having no head) may receive and be coupled to a given head, after which one or more of the processes described herein may be performed to determine an offset lateral writing position to be implemented in future write operations. In other embodiments, the data describing a lateral writing position may be computed in response to some criterion, such as in response to a high error rate, upon receiving an instruction to perform the computation (e.g., on demand), upon a repair of the drive, after a predetermined quantity of use of the drive, etc.

In some embodiments, the information gathered in operation 902 may be based on the physical construction of the writers themselves. In one approach, the information gathered in operation 902 above may be gathered by determining physical characteristics of magnetic poles of the writers in the array. The physical characteristics of magnetic poles may include stripe height, thickness, cross-track width, pitch (e.g., center-to-center) between writers of an array, etc., depending on the desired embodiment. Moreover, physical characteristics of writers may be determined using an Atomic Force Microscope (AFM) or any other fine analysis device which would be apparent to one skilled in the art, e.g., to detect the location of edges of each pole.

As previously mentioned, characteristics of writers may vary as a result of manufacturing imperfections, material properties, operator error, etc. For example, undesirable and/or unpredicted positioning of shingled tracks may result from a deviation of writing track width from a nominal design value. It follows that two writers may have noticeably different physical characteristics, although it may be intended that their physical characteristics are substantially the same. As a result, a data track written by one of the writers may be noticeably different from a data track written by the second writer (e.g., as seen above in FIGS. 8B and 8E). These differences are desirably accounted for by implementing the operations of method 900.

Discrepancies between nominal design and actual characteristics of writers may result in a lateral displacement between nominal design and actual locations of data tracks when written to media, e.g., as seen in FIGS. 8A-8F. For example, a data track written to tape by an array of writers may have a lateral offset between a reference point at a nominal design position of the data track on the tape and a reference point at the actual position of the data track on the tape. By determining the lateral offset corresponding to a given array of writers, data describing a lateral writing position to use during writing may be computed such that shingled track edges are aligned according to a format. Thus, implementing the computed lateral writing position when writing data to a magnetic medium may result in improved magnetic track placement and reduced readback error rates.

Moreover, as previously mentioned, the information about how an array of writers actually write and/or are expected to write data to a medium may be gathered from various sources and/or using various processes. According to other embodiments, information about how an array of writers actually write and/or are expected to write to a magnetic medium during shingled recording may be gathered by evaluating the writing performance of an array of writers in each drive. It should be noted that the various embodiments described herein may be implemented in embodiments having multiple writers which may be capable of concurrently writing multiple tracks. Accordingly, there may be space between each of the multiple writers in a given embodiment thereby enabling shingled writing to multiple tracks concurrently, as would be appreciated by one skilled in the art upon reading the present description.

In one approach, the information about how an array of writers actually write and/or are expected to write to a magnetic medium during shingled recording may be gathered by imaging magnetic domains of data tracks after they have been written by the array of writers to a magnetic medium. Thus, the data written by an array of writers may itself be examined to determine information about how the array of writers actually write and/or are expected to write to a magnetic medium. Depending on the desired approach, imaging magnetic domains of written data tracks may be performed using a Magnetic Force Microscope (MFM), magnetic fluid developing, etc. By imaging magnetic domains of written data tracks, characteristics of the corresponding array of writers may be derived therefrom and desirably used to compute data describing an offset lateral writing position to use during writing (e.g., see operation 906 above), such as may be inferred in part by determining the widths of the portions of the written tracks having straight (not curved) transitions. Moreover, implementing the computed lateral writing position when writing data to a magnetic medium results in improved magnetic track placement and reduced readback error rates.

According to an exemplary embodiment, an array of writers may be used to write data to a magnetic tape while the head having the writers is positioned at a nominal writing position in a drive. The nominal writing position may be selected using any conventional approach. For example, the nominal writing position may be a predefined writing position according to a format, a default writing position of the drive, a computed position, etc., depending on the desired approach. Accordingly, the nominal writing position may correspond to nominal design characteristics of the writers (e.g., dimensions, positions, etc.).

Once data has been written to tracks by writers oriented in the nominal writing position, a lateral offset separating the nominal design and actual locations of the data tracks may be determined by sweeping a position of a head in the cross-track direction while attempting to read data from the tracks. According to an exemplary approach, readers may be positioned at an outermost position relative to corresponding data tracks, whereby the readers may begin reading or attempting to read data from the data tracks. After an occurrence, such as after an amount of time has passed, a length of tape has been run, an amount of data has been read, etc., the position of the readers may be repositioned. The position of the readers relative to the data tracks may be gradually altered by incrementally stepping the readers in the cross-track direction by some predefined distance, e.g., about 10 nm to about 100 nm per step for about ten or more datasets, away from the outermost position. Thus, as the position of the readers is continually repositioned, the readers are incrementally repositioned across the cross-track width of the data tracks to various lateral reading positions relative to tracks having the written data.

The data read at the various lateral reading positions may be analyzed to determine the proper writing offset to apply during subsequent writing. For example, upon evaluating the readback information gathered by the readers as they are swept across the data tracks, a preferred lateral reading position for the readers may be determined. According to one approach, which is in no way intended to limit the invention, one of the lateral reading positions may be selected as a preferred lateral reading position based at least in part on an error rate experienced during the reading.

For example, the lateral reading position corresponding to the lowest error rate experienced during reading of the data tracks may be selected as the preferred lateral reading position. The error rate may be a C2 error rate, or may be any error rate metric, such as a C1 error rate, raw bit error rate, median bit error rate, average bit error rate, mean squared error (MSE), etc. depending on the desired embodiment as would be appreciated by one skilled in the art upon reading the present description.

Although the data from a single reader may be used to determine the error rate experienced during the reading, it is preferred that data from multiple readers, e.g., of an array, are used to determine the read offset point. Thus, the data from multiple readers of an array may be implemented using an average, median, worst case, etc. of the relevant values. It follows that embodiments which use data from multiple readers result in a more accurate determination of an experienced error rate by averaging a result over multiple values. In one exemplary embodiment, the error rate experienced during the reading may be determined using measurements taken concurrently from all readers in an array and combined into a single value (e.g., averaged across all readers) to form a MSE value. Therefore, each error rate reading may represent a reasonable snapshot of the MSE performance of the entire array of readers at that moment in time.

Moreover, the selected lateral reading position may be used to compute data describing a lateral writing position to implement during writing such that shingled track edges are aligned according to a format. For example, the offset of the selected lateral reading position from a nominal position may be indicative of the offset of the shingled track edges, e.g., as in FIGS. 8B and 8E, and thus used to determine how to reposition the lateral writing position. It follows that information concerning the lateral offset for a given array of writers may be gathered from data written to a magnetic recording medium from a nominal writing position by reading the data at various laterally spaced reading positions relative to tracks having the data written thereto.

According to some approaches, data may be read from the data tracks using the same drive as the drive having the array of writers which wrote the data tracks. Thus, the selected lateral reading position may correspond to the offset lateral writing position specifically for the drive.

However, in other approaches data may be read from the data tracks using a different drive than the drive having the array of writers which wrote the data tracks. Specifically, data tracks corresponding to various implementations may be read using a common drive which is different than each of the drives having the array of writers which wrote the data tracks. The common drive may include a calibrated read head having reader design tolerances. The data describing a lateral writing position may be computed based on readback signals from the common drive. Note that the calculated data describing the lateral writing position is applied to the drive that wrote the data tracks for correcting subsequently written shingled tracks. Optionally, the common drive may have a head comprised of significantly narrower readers which may improve the precision in determining the optimum offset.

According to another exemplary embodiment, an array of writers may be used to write data to a magnetic tape while a position of the head having the writers is repositioned relative to the tape in a drive. The array of writers may be repositioned between various lateral writing positions relative to the magnetic medium during the writing, thereby causing edges of the written tracks to reposition laterally with each step to a subsequent lateral writing position. According to an exemplary approach, writers may be positioned at an outermost position relative to corresponding data tracks, whereby the writers may begin writing to the data tracks. After an occurrence, such as an amount of time has passed, a length of tape has been run, an amount of data has been written, etc., the position of the writers may be repositioned laterally. The position of the writers relative to the data tracks may be gradually altered by incrementally stepping the writers in the cross-track direction by a predetermined distance, e.g., by about 10 nm to about 100 nm for about ten or more datasets, away from the outermost position. Thus, as the position of the writers continues to move laterally, the writers incrementally sweep across the cross-track width of the data tracks while writing data thereto.

The data written to the tracks is read by readers oriented at a predefined, e.g., nominal, reading position. The nominal reading position may be a predefined reading position according to a format, a default reading position of the drive, a computed position, etc. Accordingly, the nominal reading position may correspond to nominal design characteristics of the writers (e.g., dimensions, positions, etc.).

As the readers pass over the laterally shifted shingled data tracks and data is read therefrom, readback information may be gathered and evaluated. Moreover, upon evaluating the readback information, data describing a lateral writing position to use during subsequent writing based on readback information acquired during the reading may be computed. For example, a preferred offset lateral writing position may be determined. According to one approach, which is in no way intended to limit the invention, one of the lateral writing positions may be selected as a preferred lateral writing position based at least in part on an error rate experienced while reading data that was written while the writer was at that particular lateral position. For example, the lateral writing position corresponding to the lowest error rate experienced while reading the data tracks may be selected as the preferred lateral writing position. In another approach, an algorithm may process the information read back from the track written at differing lateral locations and outputs the data describing the writing position to use, potentially based on a median, bit error rate, C2 error rate, mean square error rate, etc.

Thus, as opposed to writing in a specific location and sweeping the readers thereacross to determine a preferred lateral read position, the writers may be stepped across the tape in the cross-track direction while writing data to the tape such that readers may read the data from a set of nominal reading positions to determine a preferred lateral writing position.

As described above, the data may be read by the same drive as the drive having the array of writers which wrote the data tracks, thereby correlating the offset lateral writing position specifically with the given drive. However, in other approaches data may be read from the data tracks using a different drive than the drive having the array of writers which wrote the data tracks. The common drive may include a calibrated read head having small reader design tolerances. Thus, the computed data describing a lateral writing position may be based on both reader and writer calibration data. Note that the calculated data describing the lateral writing position is applied to the drive that wrote the data tracks for correcting subsequently written shingled tracks.

After an offset lateral writing position is determined using any of the processes described and/or suggested herein, the offset lateral writing position is preferably applied during subsequent shingled writing. As described above, the offset lateral writing position may be used to reposition a writing position of the array of writers from a nominal writing position to better mirror the actual characteristics of the writers and/or readers of a given drive. By applying the offset lateral writing position during subsequent shingled writing, improved magnetic track placement and reduced readback error rates may desirably be achieved and improved interchange of tapes so written may be achieved.

Figure 10A:
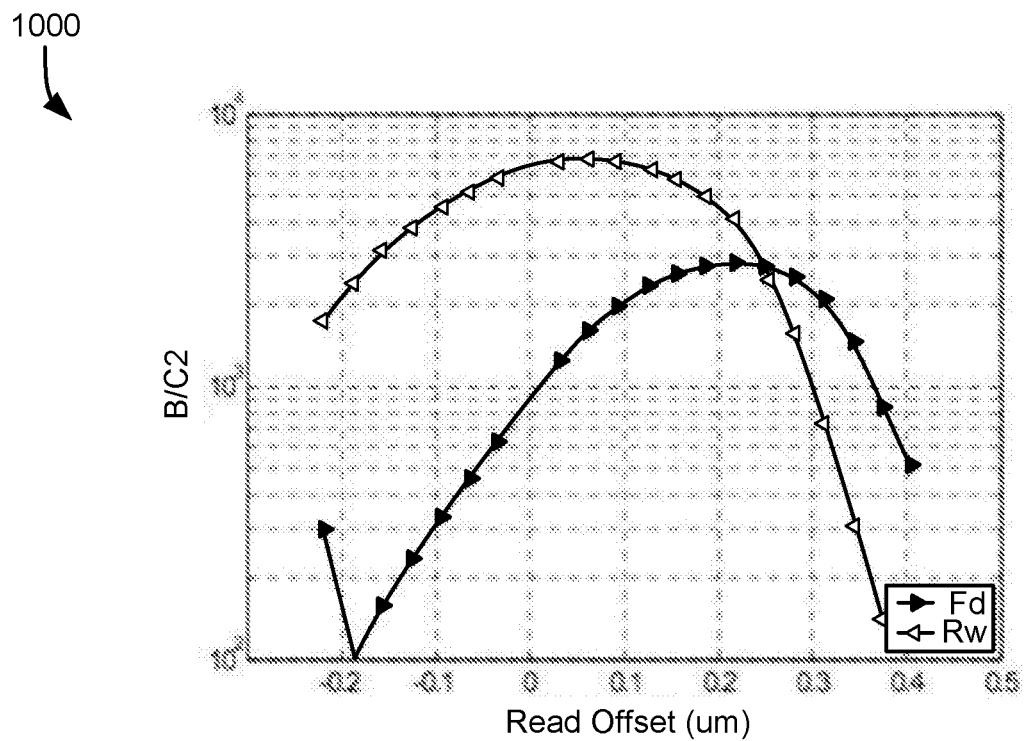
FIGS. 10A-10B are graphs of the bytes/C2 readback error rate vs. lateral read offset before and after applying a lateral write position offset.

Looking to FIG. 10A, graph 1000 depicts the bytes/C2 readback error rate vs. lateral read offset (lateral reading position) experienced while reading a tape using conventional processes. Specifically, the results plotted in graph 1000 resulted from writing data tracks to and reading data tracks from tape while relying on the nominal design characteristics of the writers and readers. However, as previously described, differences may exist between nominal design and actual characteristics of writers, thereby resulting in differences between intended and actual data tracks, e.g., as seen in FIGS. 8A-8F. Accordingly, a reader may be oriented at a position anticipated to align with a data track according to the nominal design characteristics of an array of writers, yet, the actual characteristics of the written track may differ, thereby causing readers to be misaligned with the track and possibly even span onto adjacent tracks.

Referring still to FIG. 10A, "0" along the x-axis of graph 1000 represents the optimal reading position when reading tracks from a given tape according to the nominal design. However, the peaks of the plots illustrated in graph 1000 represent the highest achieved bytes/C2 readback error rate achieved by forcefully spanning readers laterally from one side to the other side of the tracks in steps. Accordingly, the peaks of the plots represent the actual optimal reading position determined for the readers when reading from the tape. It follows that assuming the nominal design characteristics of shingled tracks mirror the actual characteristics of shingled tracks produces inaccurate results for both forward and reverse tape travel directions.

Figure 10B:
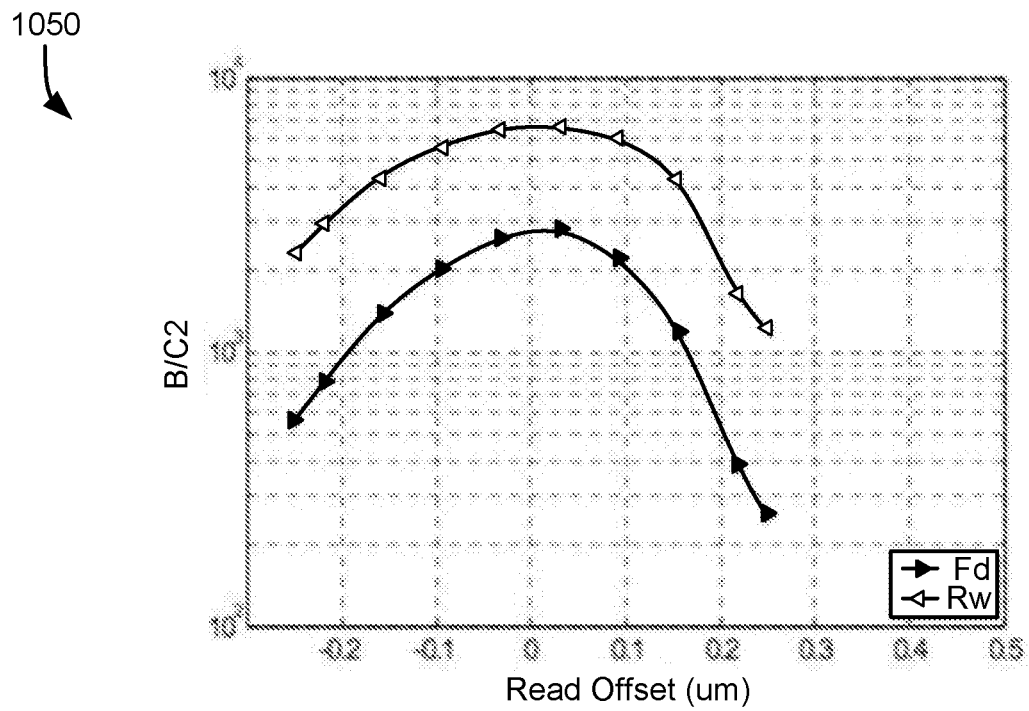

In sharp contrast, graph 1050 of FIG. 10B illustrates the results achieved after implementing an offset lateral writing position achieved using an approach described herein. Similar results can be expected using any approach herein. As illustrated in graph 1050, "0" along the x-axis (the optimal reading position according to the nominal design) significantly aligns with the peaks of the plots (the actual optimal reading position) for both forward and reverse tape travel directions. Accordingly, by implementing an optimal lateral writing position to account for any differences between the nominal design and actual characteristics of the writers, improved readback performance is desirably achieved.

However, as previously mentioned, it is in no way required to implement an offset lateral writing position while writing to magnetic media. In some embodiments, the nominal design and actual characteristics of the writers may be matched, a difference between the nominal design and actual characteristics of the writers may be within a design tolerance, etc. Thus, in some embodiments an array of writers may write data tracks having characteristics which match nominal design characteristics thereof. Accordingly, data may be written and efficiently read without implementing an offset lateral writing position. It follows that in some approaches, application of an offset lateral writing position may be disengaged by user override, waived upon detecting a predetermined condition, etc. (e.g., see decision 904 above).

Figure 11:
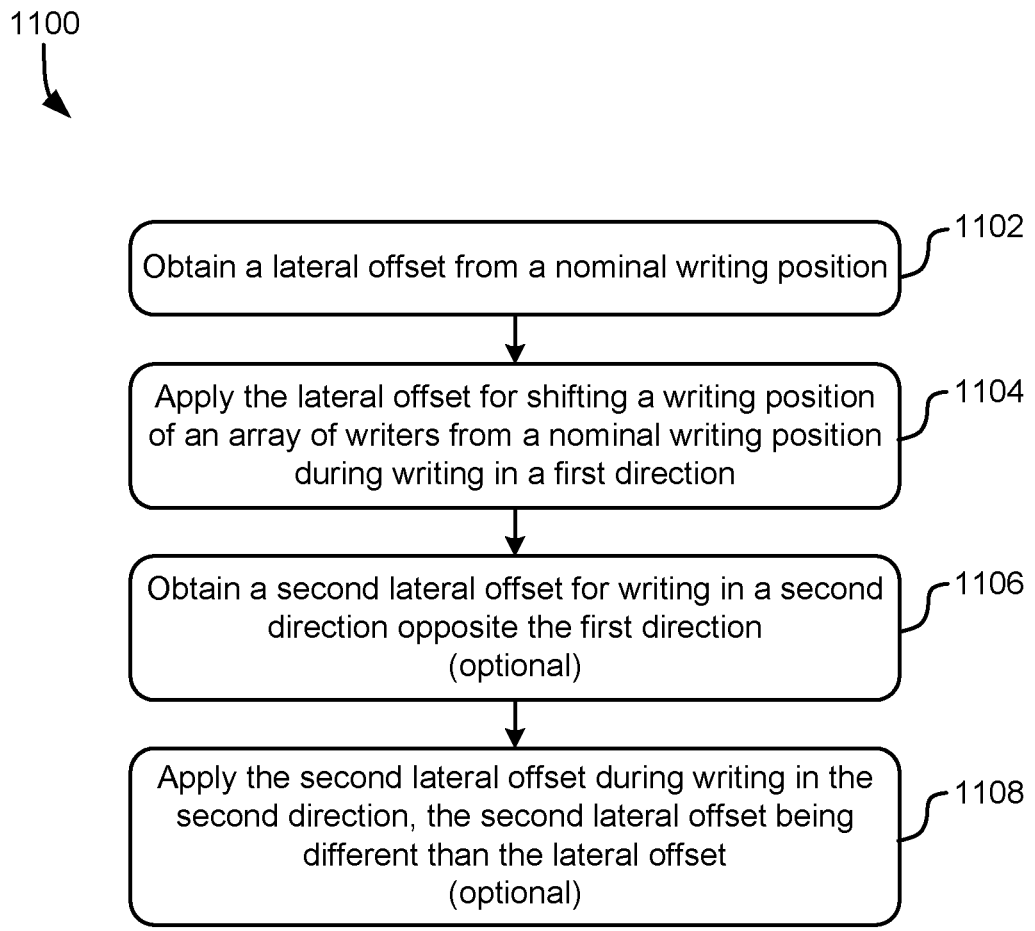
FIG. 11 is a flowchart of a method according to one embodiment.

Referring now to FIG. 11, a flowchart of a method 1100 is shown according to an illustrative embodiment. The method 1100 may be performed in accordance with the present invention in any of the environments depicted in FIGS. 1-7, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by a controller (e.g., see 128 of FIG. 1A), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1100. Illustrative processors include, but are not limited to, a CPU, an ASIC, a FPGA, etc., combinations thereof, or any other suitable computing device known in the art.

As shown in FIG. 11, method 1100 includes operation 1102 in which a lateral offset from a nominal writing position is obtained for a first writing direction. According to some embodiments, the lateral offset may be obtained using any one or more of the operations described above with reference to method 900 of FIG. 9.

Referring still to method 1100, operation 1104 includes applying the lateral offset for repositioning a writing position of an array of writers from nominal writing positions during writing in a first direction. As described above, the lateral offset may be used to determine an offset lateral writing position which repositions the writing position of the array of writers away from a nominal writing position to better mirror the actual characteristics of the writers and/or readers of a given drive. By applying the offset lateral writing position offset during subsequent shingled writing, improved magnetic track placement and reduced readback error rates may desirably be achieved.

Embodiments which implement bi-directional writing may include obtaining a second lateral offset to be applied when writing in a second direction opposite the first. Accordingly, method 1100 further includes optional operation 1106 where a second lateral offset is obtained for writing in a second direction opposite the first direction. Moreover, optional operation 1108 includes applying the second lateral offset during writing in the second direction, the second lateral offset being different than the lateral offset obtained in operation 1102.

Bi-directional shingled writing may be performed using serpentine or non-serpentine writing. Moreover, depending on the configuration of the transducers in a given module, more than one method of writing shingled data tracks may be possible. For example, modules having a reader-writer-reader (RWR) transducer configuration in a magnetic head may conduct non-serpentine writing. This is primarily because a RWR transducer configuration allows the same writer array to write each adjoining data track, despite reversal of the tape direction and/or orientation of the transducer while writing thereto, as is achieved in serpentine writing in general. This may reduce writing errors, readback errors, data loss, etc., as well as reducing the misregistration budgeting requirements, as only one set of track tolerances comes into play. Moreover, using the same writer array to write adjoining data tracks ensures consistency while writing, e.g., by enabling accurate lateral offsets, lateral writing positions, symmetrical servo pattern reading, overall higher areal density, etc.

Although the same writer array may be used to write adjoining data tracks in both first and second directions, different offset lateral writing positions may be applied to the writer array for each of the directions. As mentioned above in method 1100, a first lateral offset may be obtained and/or applied to reposition the writing position of an array of writers from a nominal writing position to an offset lateral writing position during writing in a first direction, while a second lateral offset may be obtained and/or applied to reposition the writing position of an array of writers from a nominal writing position to a different offset lateral writing position during writing in a second direction opposite the first direction, such as would be desired when using a single write head for serpentine writing in which the opposite writing edges are used for the opposite directions.

Furthermore, it should be noted that in some embodiments, a lateral offset may be predetermined (e.g., at a point of writing of the tape by a particular drive) and stored in memory. Thus, according to some approaches, the lateral offset may be obtained from a media item such as a cartridge memory, from data encoded on the magnetic medium itself, etc., as described in further detail below. However, in other approaches the lateral offset may also and/or alternatively be obtained from a memory of an apparatus performing the method, e.g., tape drive memory. In further approaches, the offset may be obtained from a database, from a host, from a library controller, etc.

In one embodiment, during operation, an indication indicating that the lateral offset was used while writing may be appended to a data set on the medium. Equivalently, metadata describing that certain tracks were written using the writing offset may be stored to a memory such as the cartridge memory.

Figure 12A:
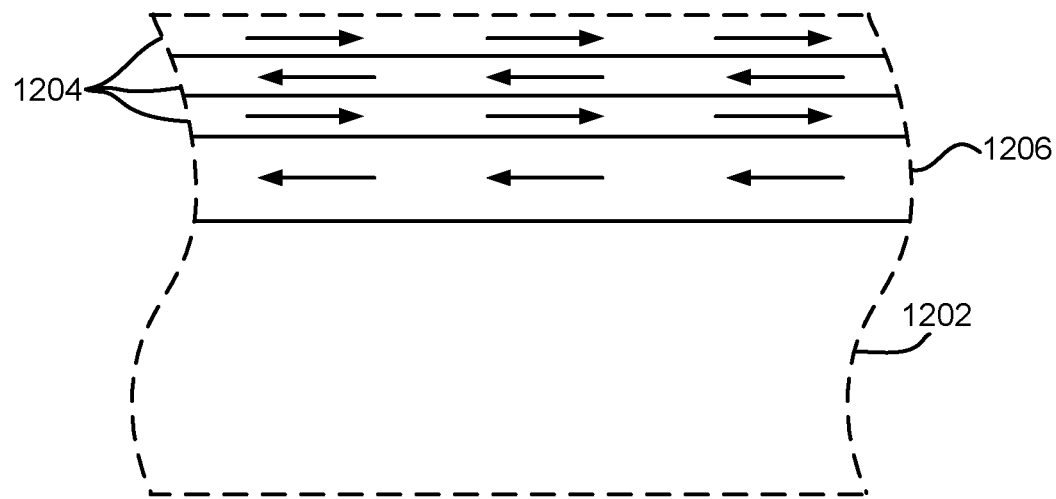
FIG. 12A is a diagram of a tape with shingled tracks written in a non-serpentine fashion according to one embodiment.
Figure 12B:
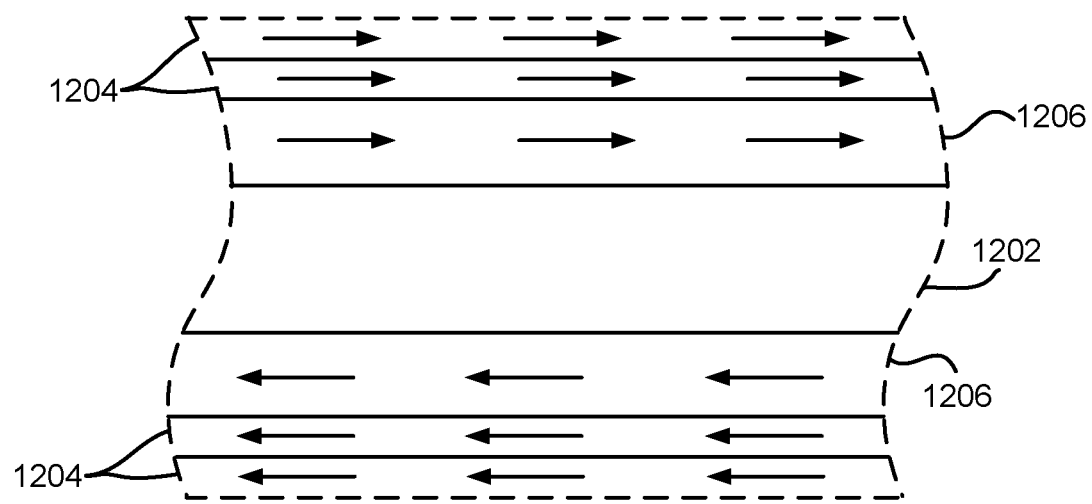
FIG. 12B is a diagram of a tape with shingled tracks written in a serpentine fashion according to one embodiment.
Figure 12C:
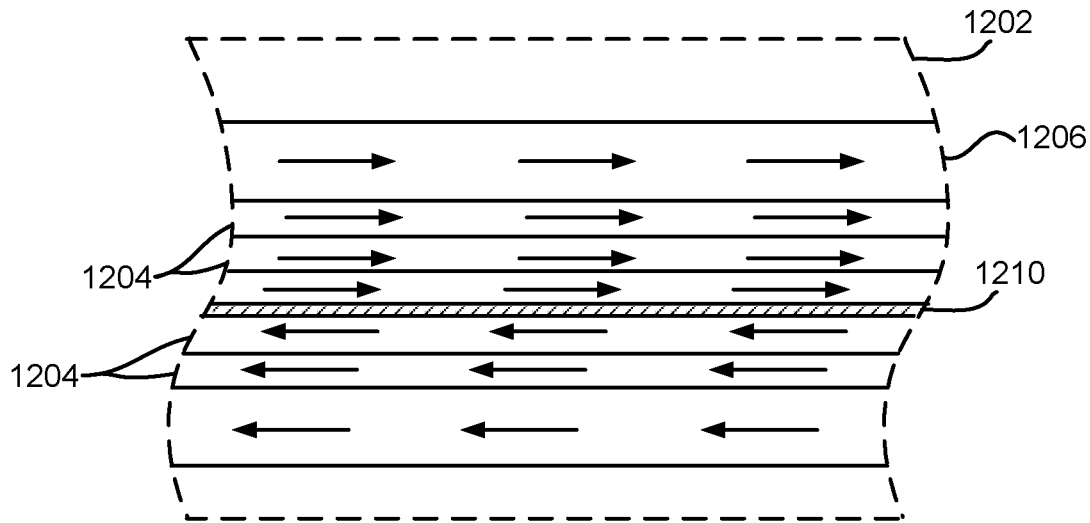
FIG. 12C is a diagram of a tape with shingled tracks written in a serpentine fashion and showing a directional buffer, according to one embodiment.

Looking now to FIGS. 12A-12C, representational diagrams of shingled writing according to different embodiments are illustrated. A shingled track 1204 may be formed on a tape 1202 by writing a track 1206 over a portion of previously written track, thereby defining a shingled track 1204 as a remaining portion of the previously written track. In different embodiments, shingled tracks 1204 may be formed using serpentine or non-serpentine writing as will soon become apparent.

As illustrated in the representational diagram of FIG. 12A, which is in no way intended to limit the invention, the orientation of the arrows in each of the tracks are intended to represent the direction of tape travel when the corresponding track was written to the tape 1202, preferably by a single array of writers configured for writing in both writing directions. Thus, a first offset lateral writing position may be applied to the writer array while writing data to tracks in a first direction and a second offset lateral writing position may be applied to the writer array while writing data to tracks in a second direction opposite the first direction, but this may not be necessary when shingling as shown with the a given write head.

Note that, while not ideal, a writer-reader-writer (WRW) transducer configuration in a magnetic head may be used for non-serpentine writing in some embodiments. In such embodiments, it is preferable that, while writing data to adjoining data tracks, especially shingled data tracks, the same writer array is used for the adjoining data tracks. Moreover, similar to the description presented above, different writer arrays may not be perfectly identical due to manufacturing variations, and thus may have different alignment characteristics, and therefore write data differently than may be intended. For example, the write transducers of one writer array may not have the same pitch, spacing, etc. as the write transducers of another writer array although uniformity may have been intended. Thus, using multiple writer arrays to write data to adjoining data tracks may result in small track placement errors, as the data written to the tracks may be aligned differently on each pass. According to another example, using different writer arrays may result in overwriting data on an adjoining track, thereby causing data loss if proper budgeting for this tolerance is not conducted.

However, according to another illustrative embodiment, a module may have a WRW transducer configuration, which is a preferable configuration with which to conduct serpentine writing. While writing data with a WRW configuration, the leading writer and reader are preferably active, while the trailing writer is not active, depending on the intended direction of tape travel. As a result, the leading writer array may be used to write adjoining data tracks for a first direction of tape travel, while the trailing writer array may be used to write adjoining data tracks for a second direction of tape travel opposite the first direction. Again, a first lateral offset may be obtained and/or applied to reposition the writing position of an array of writers from a nominal writing position to an offset lateral writing position during writing in a first direction, while a second lateral offset may be obtained and/or applied to reposition the writing locations of an array of writers from a nominal writing position to a different offset lateral writing position during writing in a second direction opposite the first direction.

Looking now to the representational diagram of FIG. 12B, which is in no way intended to limit the invention, the orientation of the arrows in each of the tracks are intended to represent the direction of tape travel when the corresponding track was written to the tape 1202. In contrast to the diagram of FIG. 12A, here data tracks corresponding to a first direction of tape travel are written to the top portion of a data partition, while data tracks corresponding to a second direction of tape travel are written to the bottom portion of the data partition. This preferably reduces writing errors, readback errors, data loss, etc. and ensures consistency while writing, e.g., by enabling symmetrical servo pattern reading.

Furthermore, FIG. 12C depicts another serpentine writing pattern. A buffer 1210, sometimes called a directional buffer, provides a spacing between the closest tracks written in opposite directions. In one approach, the amount of lateral repositioning may be reduced slightly from the ideal amount to ensure that subsequent writing errors are not encountered, for example so that the directional buffer is maintained sufficiently.

First tracks written adjacent to the directional buffer and tracks overwritten by the last writing operation when a data band is completely filled desirably have a same tracking tolerance margin as all other shingled tracks.

In one approach, the algorithms used to select the optimum writing positions account for the directional buffer, and ensure that the repositioned writing position does not adversely affect the directional buffer, e.g., by overwriting the directional buffer and perhaps into a data track on an opposite side of the directional buffer.

In an embodiment where tracks are written in opposite directions in serpentine fashion from outside in, the format may specify that the last track written in a data band shingles the last track written in the opposite direction to maximize used area. The algorithm used to select the optimum writing positions may account for this and ensure that any repositioned writing position will not create an error such as by overwriting a portion of the last track written in the opposite direction.

It follows that various embodiments described herein may be implemented with a product which includes a magnetic recording medium and data describing an offset lateral writing position to use during writing such that shingled track edges are aligned according to a format. As described above, the data describing the lateral writing position may be indicative of a lateral offset from the nominal writing position. In other words, the data describing the lateral writing position may represent an amount of space an array of writers should be offset from a nominal writing position when writing data to the tape in order to match the actual and nominal design positioning of the data tracks.

According to an illustrative approach, the data describing the lateral writing position may include information usable by a drive (e.g., see 100 of FIG. 1A) having an algorithm that computes the lateral writing position(s). The data may include values that are input into an algorithm to determine where and/or how to position a head having an array of writers preferably such that the shingled track edges are aligned according to the format.

Moreover, according to some approaches, the data may be stored in a memory coupled to the magnetic recording medium. However, according to other approaches, the data may be encoded on the magnetic recording medium itself. For example, the data may be written to a designated area of a tape.

Furthermore, some products having data written thereto may indicate whether a lateral writing position offset was used while writing the data. For example, a tape having shingled data tracks written by an array of writers while offset at a lateral writing position may include an indication that the shingled tracks written thereto are aligned as a result of implementing the offset lateral writing position. The indication may be stored in a cartridge memory, written to a designated area of the tape (e.g., a header), stored in a tracking table (e.g., a lookup table) not on the medium or cartridge e.g., in a library controller, etc. Moreover, indications may be made which denote whether certain wraps of a given tape were written using one or more offset lateral writing position. Thus, an indication may include information usable, e.g., by a drive, to determine how to read back data from the magnetic recording medium and/or perform further shingled writing. For example, a drive may implement lateral reader offsets (e.g., track following) while reading data from a tape written without using an offset lateral writing position, yet while reading data from another tape written using an offset lateral writing position, the drive may read data therefrom using a nominal reading position. As a result, drives, accessors, controllers, etc. may be able to distinguish between those tapes stored in a library and/or wraps thereof having aligned shingled tracks and those tapes stored in the library and/or wraps thereof that may have misaligned shingled tracks.

It follows that a tape written using any of the processes described and/or suggested herein is highly interchangeable and may effectively be used with any drive in view of the improved track alignment. This is because the track edges, having been corrected according to approaches herein, more closely approximate the nominal design track edge positions which the various drives may expect as a default, e.g., according to a standard.

Moreover, embodiments implementing an offset lateral writing position may be distinguished by comparing the characteristics of the actual writers on the head with the characteristics of the data tracks written using the writers. Upon determining that the characteristics of the actual writers on the head are offset from (e.g., do not match) the characteristics of the data tracks written using the writers, it may be determined that a lateral writing position has been employed to write the data to the data tracks.

As mentioned above, in some embodiments it is desirable to gather information which may be used to determine the actual location of the outer extents (e.g., track edges) of shingled tracks written by an array of writers. Again, the actual characteristics of an array of writers may vary from the nominal designs thereof. Moreover, the characteristics of shingled tracks may vary from ideal due to effects such as side-writing. Therefore, the actual characteristics of the array of writers may be unknown at a point after the writers have been formed, yet before they have been inspected. Thus, the location of shingled track edges written using the writers may initially be unknown. For example, referring again momentarily to FIGS. 8A-8B and 8D-8E, the offset (Offset) between the track edges of the shingled tracks 804 may be unknown prior to examining the physical track. However, upon determining the actual location of the shingled track edges written using an array of writers, a lateral writing position which is laterally offset from what would otherwise be a nominal actual writing position may be determined, which preferably compensates for any discrepancies between actual and nominal design characteristics of the array of writers, and/or effects such as side-writing.

Figure 13A:
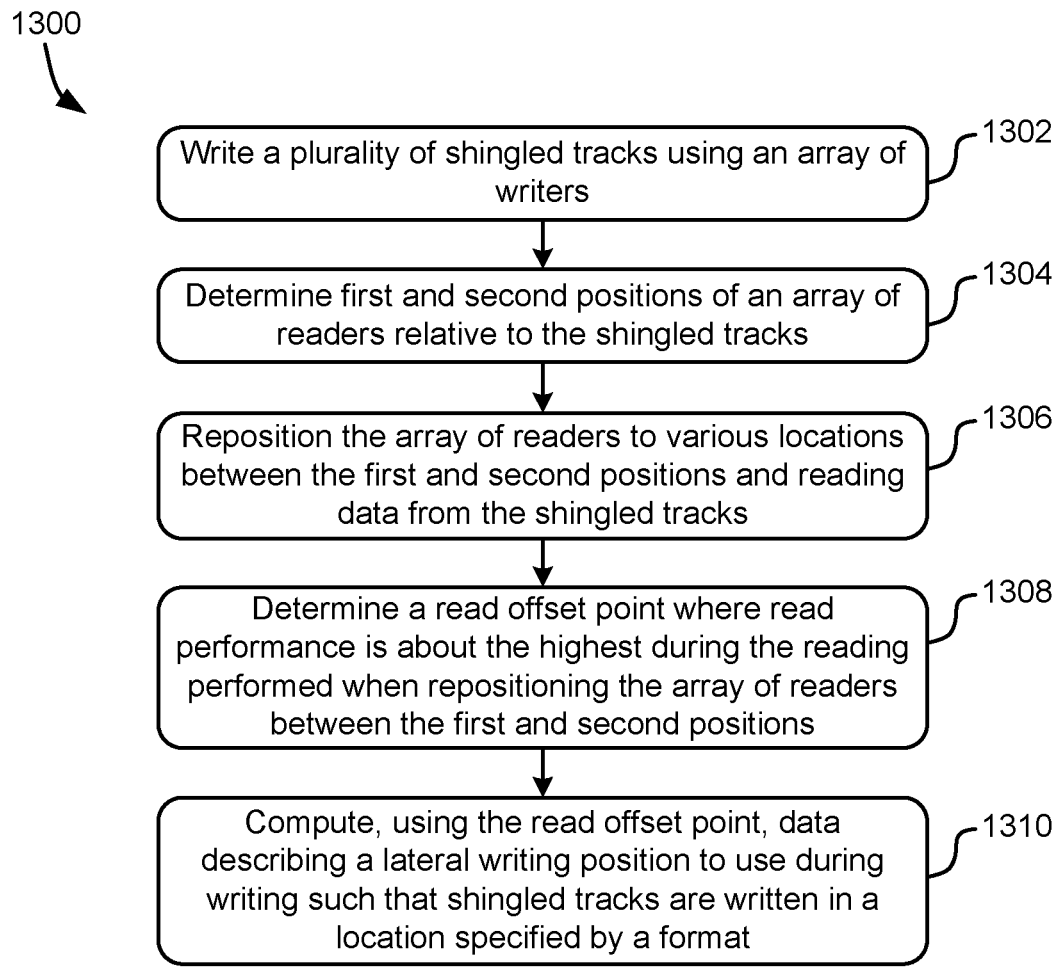
FIG. 13A is a flowchart of a method according to one embodiment.

Looking to FIG. 13A, a flowchart of a method 1300 for measuring a deviation in track position due, e.g., to side-writing effect and/or writer width deviations from design specifications, is shown according to one embodiment. The method 1300 may be performed in any of the environments depicted in FIGS. 1-7, among others, in various embodiments. Of course, more or less operations than those specifically described in FIG. 13A may be included in method 1300, as would be understood by one of skill in the art upon reading the present descriptions.

Each of the steps of the method 1300 may be performed by any suitable component of the operating environment. For example, in various embodiments, the method 1300 may be partially or entirely performed by a controller (e.g., see 128 of FIG. 1A), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1300. Illustrative processors include, but are not limited to, a CPU, an ASIC, a FPGA, etc., combinations thereof, or any other suitable computing device known in the art.

Figure 14:
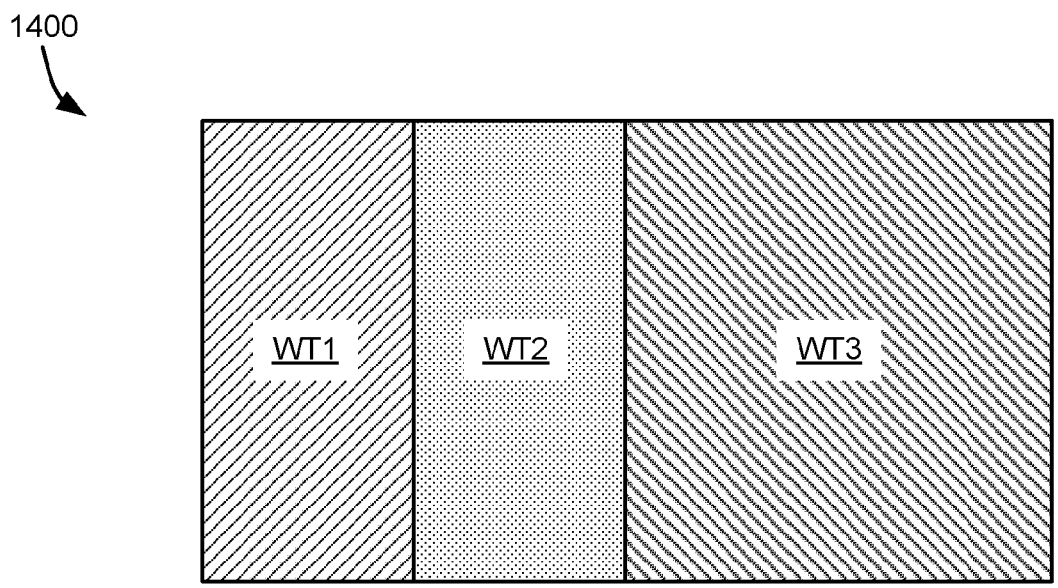
FIG. 14 is a representational diagram of a tape having shingled data tracks according to one embodiment.

As shown in FIG. 13A, method 1300 includes operation 1302, where a plurality of shingled tracks are written to a magnetic medium (e.g., magnetic tape) using an array of writers. A shingled track is preferably formed by writing three overlapped tracks. Referring momentarily to FIG. 14, tape 1400 depicts a first written track WT1, second written track WT2 and third written track WT3. As shown, the tracks WT1 and WT2 are shingled (e.g., partially overwritten) such that WT2 is sandwiched between WT1 and WT3, thereby defining the outer extents (track edges) of the shingled track WT2. It is preferred that the second written track WT2 is written using known data while the first and third written tracks WT1, WT3 are written differently than WT2. This may allow a drive having an array of readers to determine first and/or second positions near or at the track edges of WT2 when reading data written to WT2, as will be described in further detail below.

According to a preferred approach, WT2 may include formatted data from any source, e.g., such as user data, as would be appreciated by one skilled in the art upon reading the present description. For example, the formatted data may include data that has been deserialized to multiple channels, encoded with error correction information, time interleaved, and/or compressed. In contrast, the first and/or third written tracks WT1, WT3 may include an erase band, tone data, etc., or any other pattern of data which is of a different type than the data written to WT2. However, it should be noted that in some approaches, which are in no way intended to limit the invention, WT2 may have the same and/or similar data written thereto as written to WT1 and/or WT3 but offset linearly to allow distinguishing of the track edges of WT2.

Referring again to FIG. 13A, operation 1304 includes determining first and second positions of an array of readers relative to the shingled tracks. It is preferred that the first and/or second positions are above and/or beyond the track edges of the shingled tracks. Accordingly, the track area positioned between each respective pair of first and second positions may include at least a majority of the width of the shingled track. Looking again momentarily to FIG. 14, first and second positions determined in operation 1304 may correspond to a position above the WT1/WT2 border and WT2/WT3 border, respectively. However, in other approaches the first and second positions may lie beyond the WT1/WT2 and WT2/WT3 borders such that the first and second positions extend in the cross track direction over WT1 and WT3, respectively. Again, the actual characteristics of an array of writers may vary from the nominal designs thereof. Therefore, the actual characteristics of the array of writers may be unknown at a point after the writers have been formed, yet before they have been inspected. Thus, the location of shingled track edges written using the writers may initially be unknown.

Figure 13B:
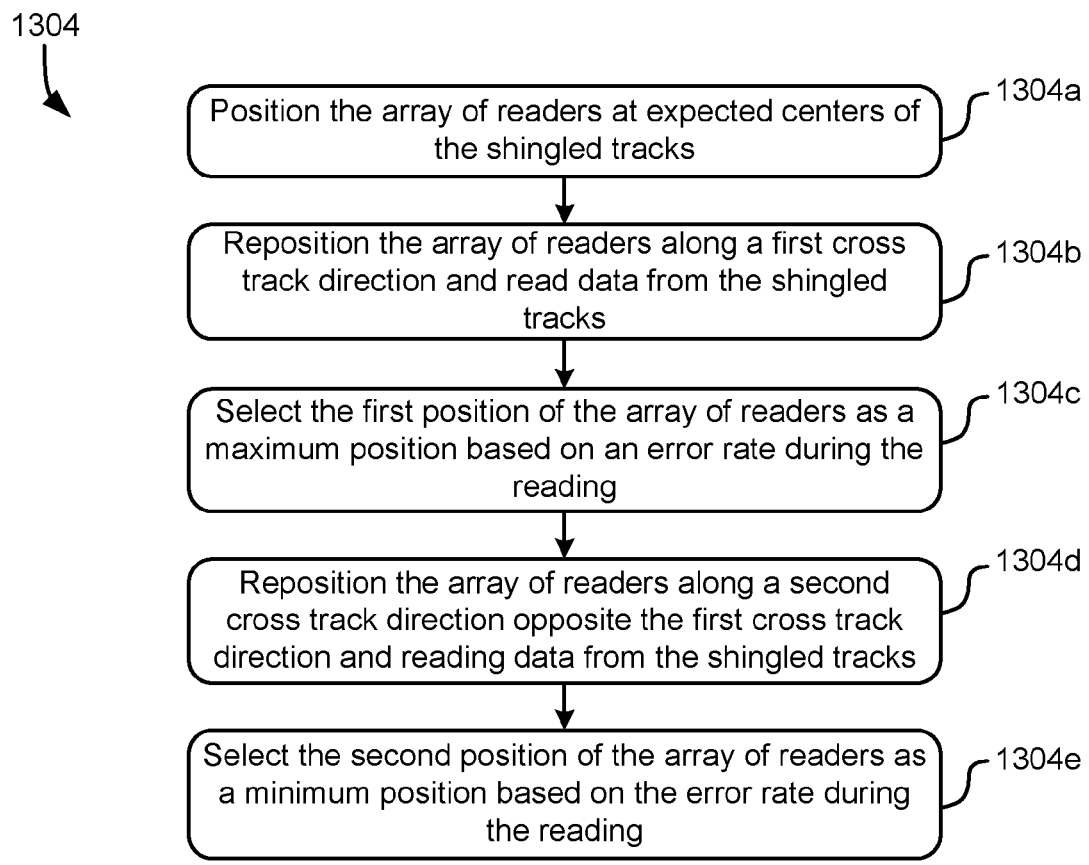
FIG. 13B is a flowchart of optional sub-operations of the method in FIG. 13A.

According to an exemplary approach, which is in no way intended to limit the invention, the first and second positions of an array of readers relative to the shingled tracks may be determined using any one or more of the sub-operations illustrated in FIG. 13B. Thus, operation 1304 may include positioning the array of readers at expected centers of the shingled tracks. See sub-operation 1304*a*. Again, a lateral offset may separate the nominal design (e.g., expected dimensions) from the actual locations of the data tracks. Moreover, the actual characteristics of written shingled tracks may be initially unknown, e.g., before being inspected. Thus, expected centers of shingled tracks may be a desirable position to initially orient the array of readers, e.g., before determining the actual centers of the shingled tracks.

Referring still to FIG. 13B, sub-operation 1304*b* includes repositioning (e.g., shifting) the array of readers along a first cross track direction in steps, continuously, etc., and reading data from the shingled tracks. In different approaches, the data may be read from the shingled tracks continuously during the repositioning, after each step, etc., depending on the way in which the array of readers are repositioned and/or depending on the desired embodiment. According to a specific approach, the array of readers may be repositioned along the first cross track direction using large steps (e.g., greater than about 100 nm, but could be smaller or larger) in addition to reading data from the shingled tracks after each large step.

Moreover, according to some approaches, data may be read from the shingled data tracks using the same drive as the drive having the array of writers which wrote the shingled data tracks. However, in other approaches data may be read from the shingled data tracks using a different drive than the drive having the array of writers which wrote the shingled data tracks. Specifically, shingled data tracks corresponding to various implementations may be read using a common drive which is different than each of the drives having the array of writers which wrote the shingled data tracks. The common drive may include a calibrated read head having reader design tolerances for achieving results having improved accuracy as previously mentioned.

As data is read from the shingled tracks, error rate information such as the MSE may be analyzed and/or used to determine the first position of the array of readers relative to the shingled tracks. Accordingly, looking to sub-operation 1304*c*, the first position of the array of readers may be selected as a maximum position based on an error rate during the reading while repositioning the array in the first cross track direction. With reference to the present description, "maximum position" is intended to mean an outermost position of the array of readers relative to the shingled tracks in the first cross track direction during the process. In other words, the maximum position may be a point associated with one of the track edges of the shingled tracks. Moreover, the maximum position may be a previously unknown position selected based on some criteria, such as the error rate meeting a condition, e.g., such as reaching and/or passing a threshold value which may be predetermined, calculated based on operational data, set based on user input, etc.

Figure 18:
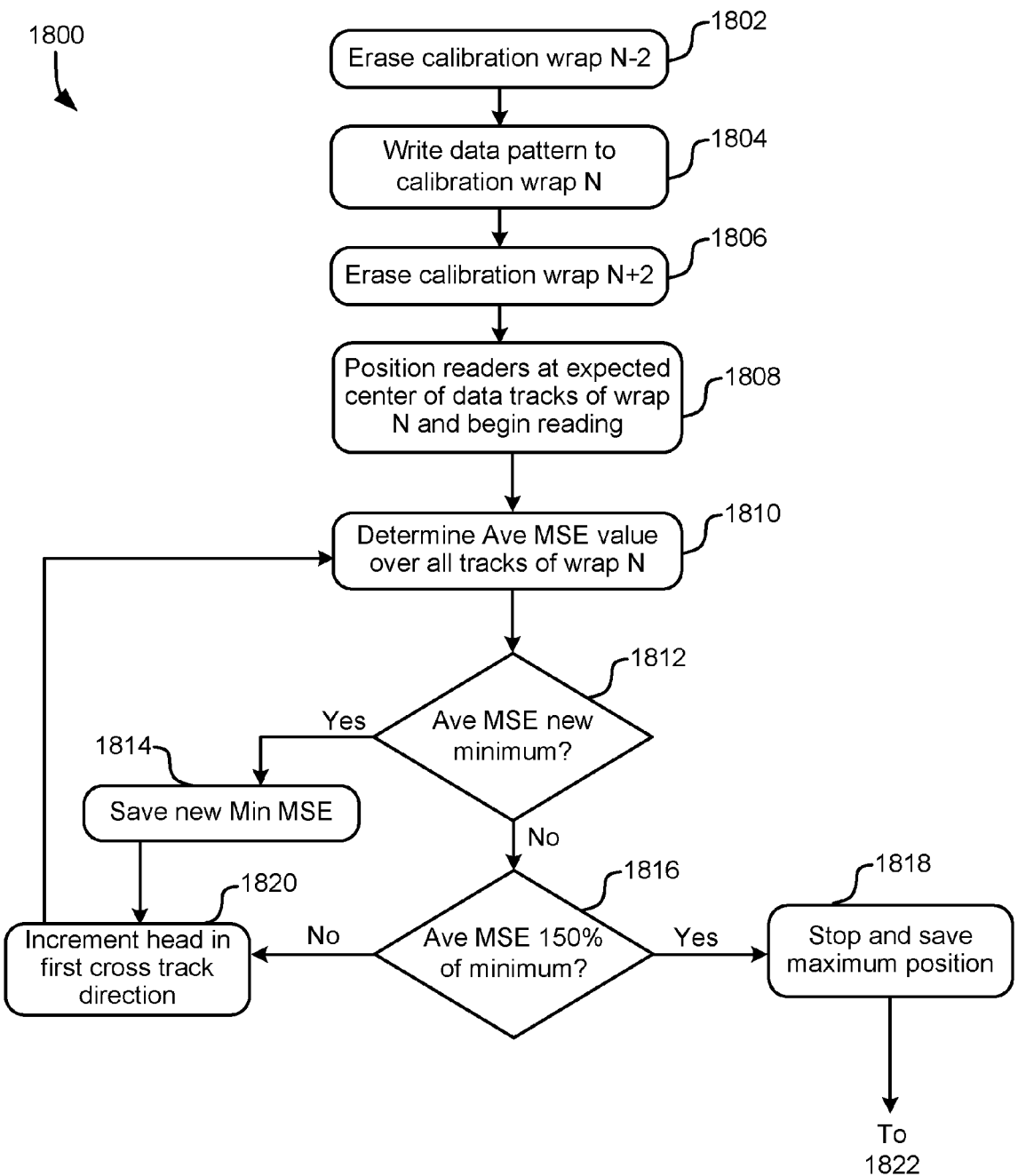
FIG. 18 is a flowchart of a method according to an exemplary embodiment.
Figure 18:
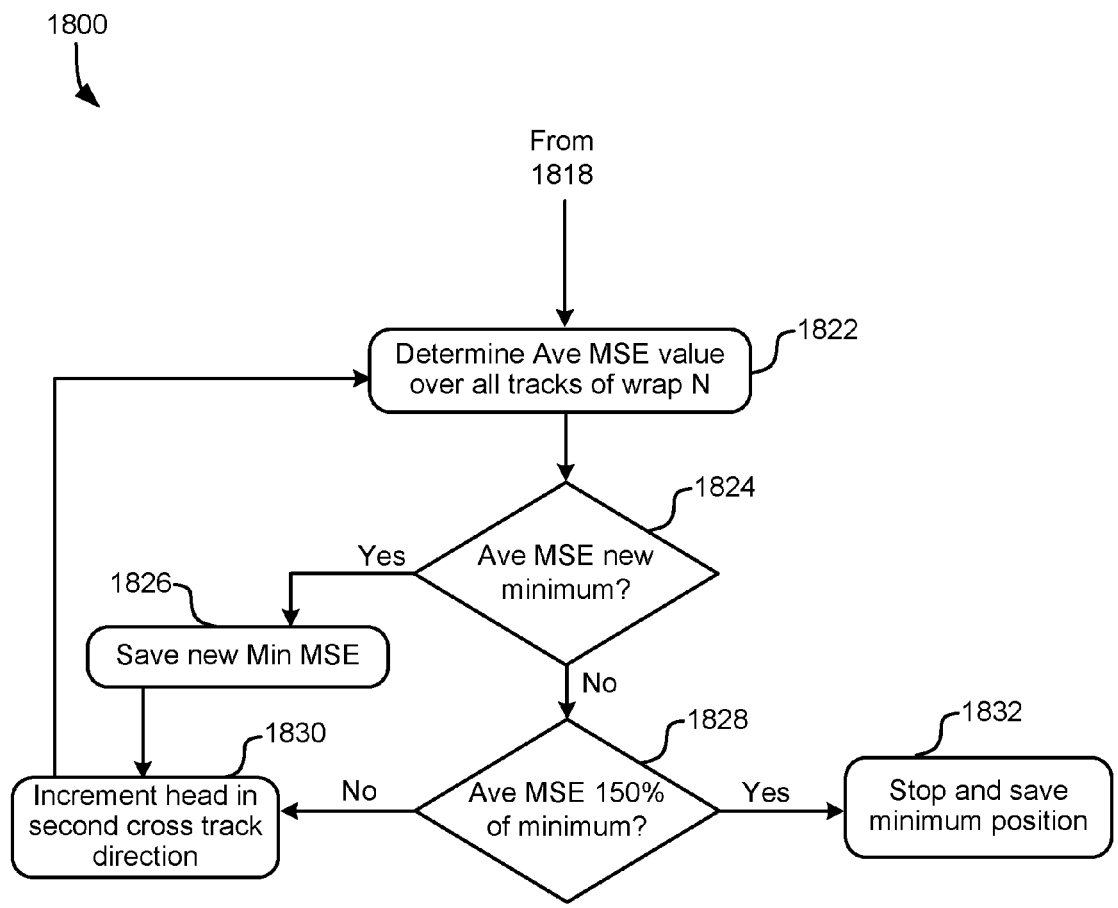

According to an example, which is in no way intended to limit the invention, sub-operations 1304*b* and 1304*c* may include repositioning the array of readers along a first cross track direction in large steps, taking single readings and computing the MSE at each position and continuing to perform larger steps along the first cross track direction until a threshold (e.g., about 150% higher than the lowest observed MSE value) has been reached, e.g., see method 1800 of FIG. 18 below. However, it should be noted that the threshold may include any desired value. Moreover, the position associated with the MSE reading which reached and/or breached the threshold may be stored as the "maximum position", thereby capturing the offset between the expected centers of the shingled tracks and the maximum position.

Furthermore, sub-operation 1304*d* includes repositioning (e.g., shifting) the array of readers along a second cross track direction opposite the first cross track direction in steps, continuously, etc., and reading data from the shingled tracks. As previously mentioned, the data may be read from the shingled tracks continuously during the repositioning, after each step, etc., depending on the way in which the array of readers are repositioned and/or depending on the desired embodiment. Moreover, the repositioning of sub-operation 1304*d* may start from the first position selected in sub-operation 1304*c*, the expected centers of the shingled tracks upon being reset thereto, or any position therebetween, depending on the desired approach. According to a specific approach, the array of readers may be repositioned along the second cross track direction using larger steps (e.g., greater than about 100 nm, but could be smaller or larger) in addition to reading data from the shingled tracks after each large step.

As data is read from the shingled tracks, error rate information such as the MSE may be analyzed and/or used to determine the second position of the array of readers relative to the shingled tracks. Accordingly, looking to sub-operation 1304*e*, the second position of the array of readers may be selected as a minimum position based on an error rate during the reading while repositioning the array in the second cross track direction, e.g., in a manner similar to the way the maximum position was found. With reference to the present description, "minimum position" is intended to mean an outermost position of the array of readers relative to the shingled tracks in the second cross track direction during the process. In other words, the minimum position may be a point substantially associated with the track edge of the shingled tracks opposite the track edge associated with the maximum position. As described above, the minimum position may be a previously unknown position selected based on some criteria, such as the error rate meeting a condition, e.g., such as reaching and/or passing a threshold value which may be predetermined, calculated based on operational data, set based on user input, etc.

Referring again to FIG. 13A, method 1300 additionally includes repositioning the array of readers to various locations between the first and second positions and reading data from the shingled tracks. See operation 1306. The repositioning of the array of readers may be performed in steps, continuously (e.g., a constant sweeping motion), etc., depending on the desired embodiment. According to some approaches, the array of readers may be repositioned each time after an occurrence, e.g., an amount of time has passed, a length of tape has been run, an amount of data has been read, etc. Thus, the position of the array of readers relative to the shingled data tracks may be gradually altered by incrementally stepping the reader in the cross-track direction by some predetermined amount, e.g., about 10 nm to about 100 nm for about ten or more datasets, between the first and second positions. Thus, as the array of readers is continually repositioned, the array may incrementally sweep across the cross-track width of the shingled data tracks to cover various lateral reading positions relative to shingled track having the written data. Moreover, the reading of data from the shingled tracks may be performed continuously during the repositioning, performed after each step of the repositioning, etc. It should be noted that although large steps may be used during the repositioning of sub-operations 1304b and 1304d, the repositioning performed in operation 1306 is preferably performed using smaller (e.g., finer) steps.

Moreover, operation 1308 includes determining a read offset point where read performance is about the highest during the reading performed when repositioning the array of readers between the first and second positions, e.g., which may have been determined using sub-operations 1304c and 1304e respectively. Thus, as the array of readers read data from the shingled tracks, error rate information may be analyzed and/or stored. Moreover, the highest read performance may be determined using any known procedure which utilizes a mean squared error rate of the readers, a C2 error rate, a C1 error rate, etc.

It follows that the read offset point where read performance is about the highest, e.g., as exemplified by a lowest error rate, etc., may be determined by selectively positioning the array of readers over the shingled data tracks and attempting to read data therefrom. Specifically, the read offset point may be determined by repositioning the array of readers between the first and second positions of the shingled data tracks while reading, or attempting to read, data from the shingled tracks.

Figure 15A:
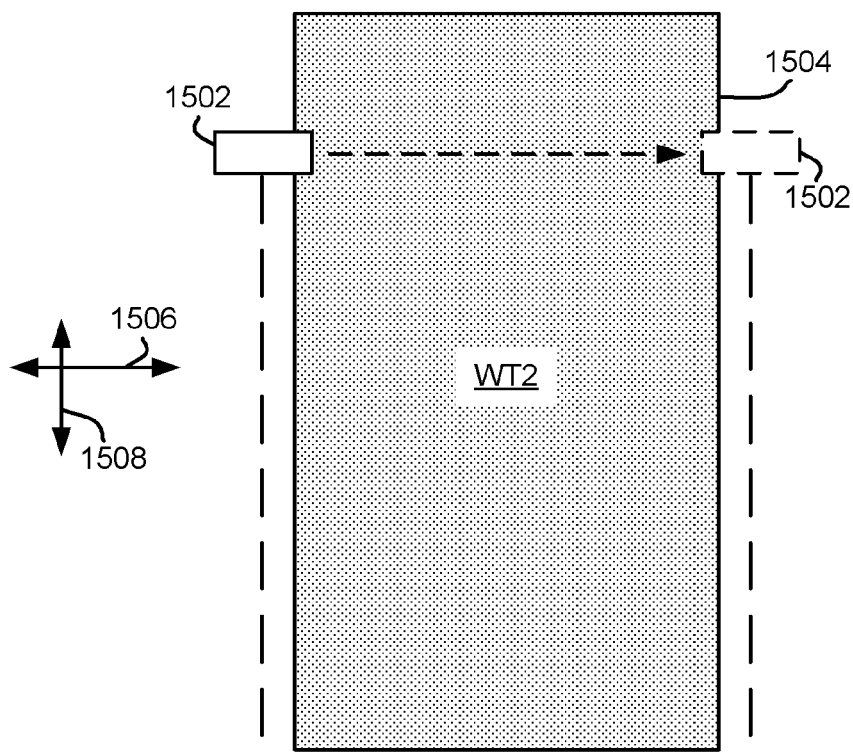
FIG. 15A is a representational diagram of a shingled data track according to one embodiment.

Looking to the exemplary embodiment illustrated in FIG. 15A, a reader 1502 is shown at about a first position relative to the shingled track 1504. Over time, the reader 1502 may be continuously or incrementally repositioned (e.g., swept) across the shingled track 1504 in the cross-track direction 1506, e.g., until reaching a second position (shown in shadow) near an outermost position of the shingled track 1504 opposite the first position. It follows that as the position of the reader 1502 relative to the shingled track 1504 changes, the readback performance will change as well while data is read from the shingled track 1504 as the magnetic medium, on which the shingled track 1504 is written, travels in the intended direction of tape motion 1508.

It should be noted that although a single reader 1502 is shown in the present embodiment, this is in no way intended to limit the invention. Rather, similar motion and similar outputs may be achieved by all readers in an array. Although the data from a single reader may be used to determine the read offset point where read performance is about the highest, it is preferred that data from multiple readers of an array are used to determine the read offset point. The data from multiple readers of an array may be implemented using an average, median, worst case, etc. of the relevant values. It follows that embodiments which use data from multiple readers tend to result in a more accurate determination of the read offset point, e.g., by averaging a result over multiple values. In one exemplary embodiment, the readback data within a predetermined interval of the median may be included in the computation of the read offset point.

Moreover, it should also be noted that although the leftmost position in FIG. 15A is referred to as the first position while the rightmost position (in shadow) is referred to as the second position, the relative orientation of the first and second positions are in no way intended to be limited thereto. For example, in another embodiment the first position may be represented by the rightmost position, while the second position may be represented by the leftmost position.

Figure 15B:
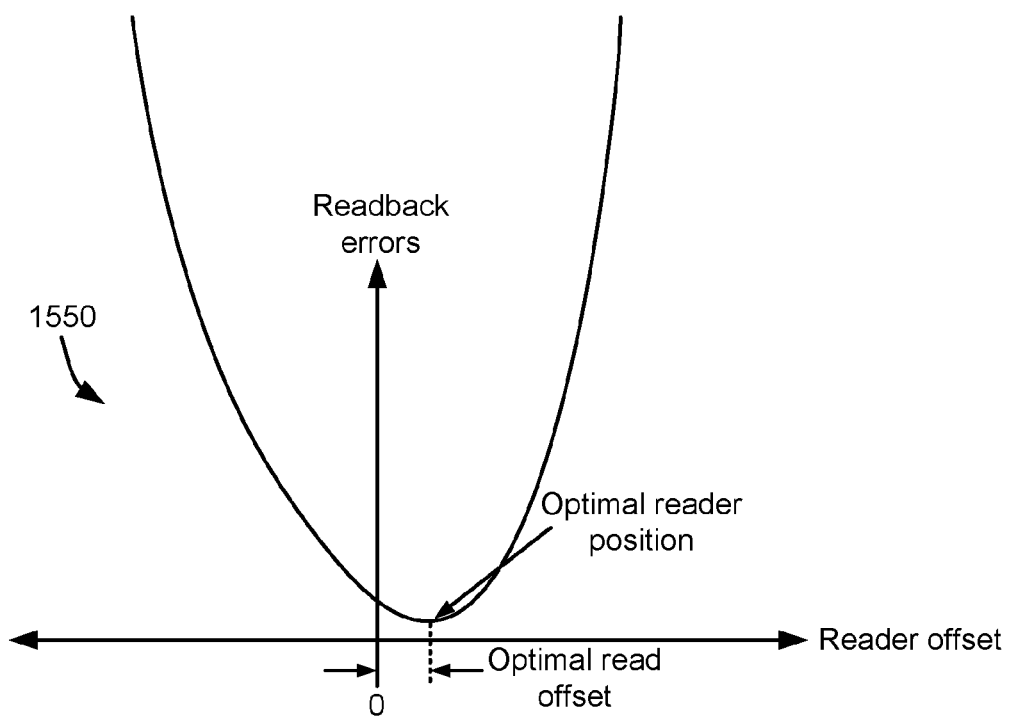
FIG. 15B is a graph illustrating readback errors v. reader offset according to one embodiment.

Furthermore, FIG. 15B includes a graph 1550 which outlines an exemplary readback performance that may be calculated as the reader 1502 is swept across the shingled data track 1504. As shown, the readback performance is least favorable as having the highest number of read errors occurring when the reader 1502 is positioned at about the first position which corresponds to an outermost position used in the process relative to the shingled track 1504. However, as the reader 1502 moves towards the center of the shingled data track 1504, the number of read errors experienced by the reader 1502 drops until a minimum value is achieved before rising again. The orientation of the reader 1502 relative to the shingled data track 1504 associated with the minimum value projected on the graph 1550 corresponds to an optimal reader position as denoted. In other words, the optimal reader position preferably represents the read offset point where read performance is about the highest. Moreover, the difference between the optimal reader position and the nominal reading position, having an offset of zero (i.e., the origin on graph 1550), indicates the optimal read offset.

Referring once again to FIG. 13A, method 1300 further includes computing, using the read offset point, data describing a lateral writing position to use during writing such that shingled tracks are written in a location specified by a format. See operation 1310. The data describing the lateral writing position may be indicative of a lateral offset from the nominal writing position. In other words, the data describing the lateral writing position may represent an amount of space an array of writers should be offset from a nominal writing position when writing data to the tape in order to match the actual and nominal design positioning of the data tracks. Thus, the lateral writing position may implement a lateral offset which is applied to the position of the array of writers relative to the magnetic medium.

According to an illustrative approach, the data describing the lateral writing position may include information usable by a drive (e.g., see 100 of FIG. 1A) having an algorithm that computes the lateral writing position(s). Thus, the data may include values that are input into an algorithm to determine where and/or how to position a head having an array of writers preferably such that the shingled track edges are aligned according to the format.

Upon computing the resultant data describing a lateral writing position, the data may be stored in memory, e.g., a lookup table in non-volatile memory, which may be accessed by: the drive associated thereto, a controller of the associated drive, a user of the drive, etc. Thus, the data describing a lateral writing position may be available to the associated drive when desired at a future point in time, e.g., even after power cycling of the drive.

Depending on the approach, the lateral writing position may be based on track edges, shingled track centers, an ideal writing position that compensates for the effects of side-writing, etc. Preferably, the lateral writing position offset is selected such that tracks may be written in the ideal reading position which may be determined using one or more operations of the present methodology. Although applying the lateral writing position may desirably align the nominal reading position along the centerline of the shingled tracks in various embodiments, in other embodiments the lateral writing position may purposefully offset the nominal reading position from the centerline of the shingled tracks, e.g., to account for the curved transition edges and/or the effects of side-writing. According to an example, the lateral writing position may be laterally repositioned by about an additional 2-10% of the shingled track width towards the curved edges of the magnetic transitions of the track being read, or vice versa. Moreover, according to another example, the lateral writing position may be laterally repositioned by a desired amount to compensate for side-writing.

The operations of method 1300 may desirably be performed in a short period of time. Depending on the manner in which the operations are performed, method 1300 may be performed in less than two minutes, preferably less than 90 seconds, ideally in less than one minute. The faster performance times (e.g., less than about one minute to perform the operations of method 1300) may be achieved, for example, by implementing MSE in the various operations thereof. However, depending on the desired embodiment, error rate information available, etc., any other type of error rate information may be implemented, e.g., C2 error rate information, C1 error rate information, etc.

As previously mentioned, the sub-operations illustrated in FIG. 13B provide an exemplary approach for determining the first and second positions of an array of readers relative to the shingled tracks, which is in no way intended to limit the invention. Accordingly, the first and/or second positions of the array of readers relative to the shingled tracks may be determined differently in operation 1304 according to alternate approaches. For example, in some approaches the first and/or second positions of the array may be determined by imaging magnetic domains of the plurality of shingled tracks written by the array of writers. Thus, the data written by an array of writers may itself be examined to determine information regarding a deviation in track position due, e.g., to side-writing effect and/or writer width deviations from design specifications. Depending on the desired approach, imaging magnetic domains of written data tracks may be performed using a Magnetic Force Microscope (MFM), magnetic fluid developing, etc., or any other approach described above.

In other approaches, the first and/or second positions of the array may be determined using physical characteristics of magnetic poles of the writers in the array of writers. The physical characteristics of magnetic poles may include stripe height, thickness, cross-track width, pitch (e.g., center-to-center) between writers of an array, etc., depending on the desired embodiment. Moreover, physical characteristics of writers may be determined using an Atomic Force Microscope (AFM) or any other fine analysis device which would be apparent to one skilled in the art, e.g., to detect the location of edges of each pole.

As previously mentioned, characteristics of writers may vary as a result of manufacturing imperfections, material properties, operator error, etc. For example, undesirable and/or unpredicted positioning of shingled tracks may result from a deviation of writing track width from a nominal design value. It follows that two writers may have noticeably different physical characteristics, although it may be intended that their physical characteristics are substantially the same. As a result, a data track written by one of the writers may be noticeably different from a data track written by the second writer (e.g., as seen above in FIGS. 8B and 8E).

Discrepancies between nominal design and actual characteristics of writers may result in a lateral displacement between nominal design and actual locations of data tracks when written to media, e.g., as seen in FIGS. 8A-8F. For example, a data track written to tape by an array of writers may have a lateral offset between a reference point at a nominal design position of the data track on the tape and a reference point at the actual position of the data track on the tape. By determining the lateral offset corresponding to a given array of writers, data describing a lateral writing position to use during writing may be computed such that shingled track edges are aligned according to a format. Thus, implementing the computed lateral writing position when writing data to a magnetic medium may result in improved magnetic track placement and reduced readback error rates.

In view of the improved magnetic track placement and reduced readback error rates achieved as a result of implementing some of the approaches described above, it is desirable that the data describing the lateral writing position (e.g., computed in operation 1310) is applied during subsequent shingled writing. According to some approaches, the data describing the lateral writing position may be directly applied to future shingled writing, e.g., to ensure desirable track alignment, reduced readback error rates, etc., for user data written to magnetic medium. In one illustrative embodiment, which is in no way intended to limit the invention, logic integrated with and/or executable by a controller (e.g., see 128 of FIG. 1A) may be configured to apply the lateral writing position for repositioning a writing position of the array of writers from a nominal writing position. However, in other approaches, the data describing the lateral writing position may first be verified before being applied by subsequent shingled writing, as will be described in further detail below.

Figure 16:
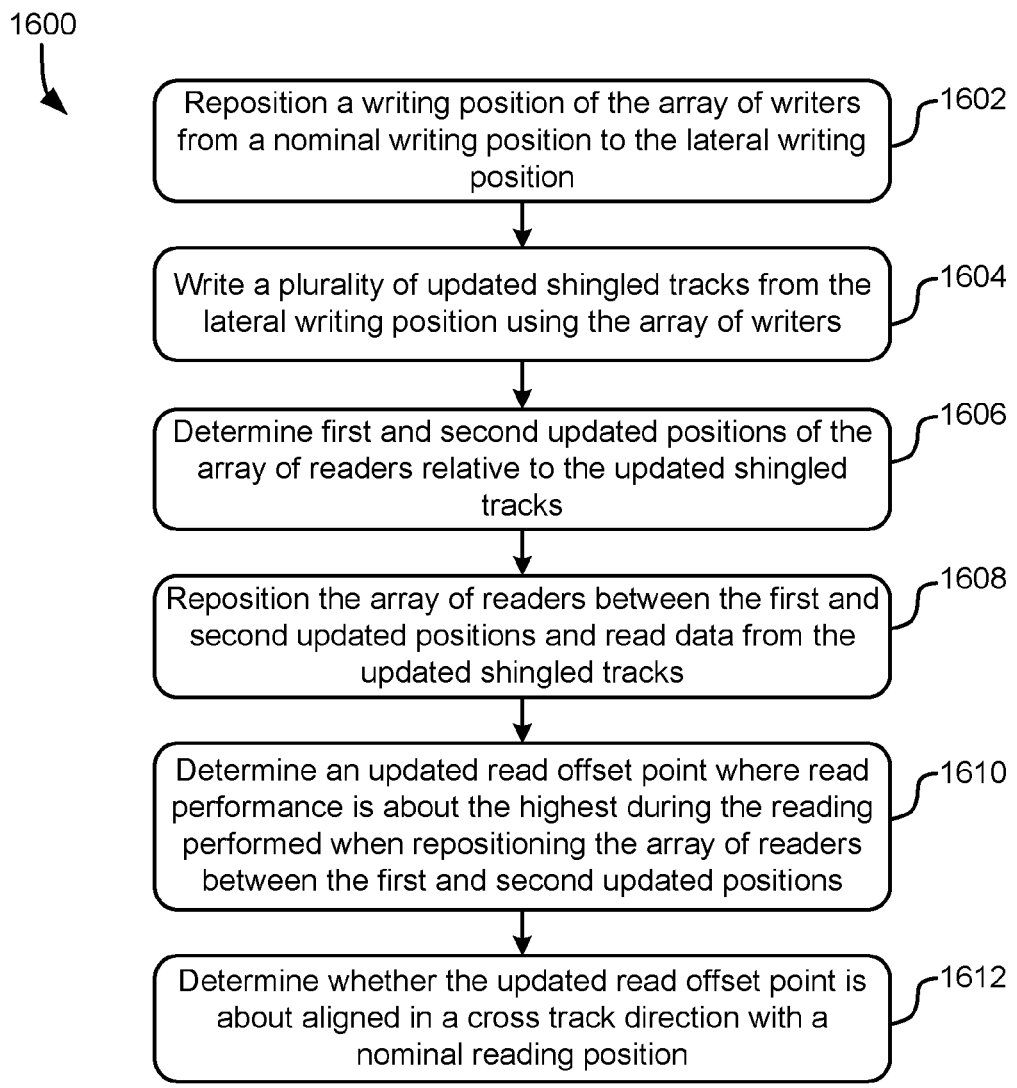
FIG. 16 is a flowchart of a method according to one embodiment.

Looking to FIG. 16, a flowchart of a method 1600 for verifying data describing the lateral writing position, is shown according to one embodiment. The method 1600 may be performed in any of the environments depicted in FIGS. 1-7 and 13A-13B, among others, in various embodiments. Of course, more or less operations than those specifically described in FIG. 16 may be included in method 1600, as would be understood by one of skill in the art upon reading the present descriptions.

Each of the steps of the method 1600 may be performed by any suitable component of the operating environment. For example, in various embodiments, the method 1600 may be partially or entirely performed by a controller (e.g., see 128 of FIG. 1A), a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1600. Illustrative processors include, but are not limited to, a CPU, an ASIC, a FPGA, etc., combinations thereof, or any other suitable computing device known in the art.

As shown in FIG. 16, method 1600 includes repositioning the array of writers from a nominal writing position to the lateral writing position. See operation 1602. Accordingly, the array of writers may be laterally offset from a nominal writing position, e.g., depending on the data describing the lateral writing position.

Moreover, method 1600 includes writing a plurality of updated shingled tracks from the repositioned writing position using the array of writers. See operation 1604. The plurality of updated shingled tracks may be written to a new (e.g., unused) portion of the magnetic medium and/or written over the shingled tracks used to determine the data describing the lateral writing position depending on the desired embodiment. Moreover, the plurality of updated shingled tracks may each be formed by writing three overlapped tracks, e.g., see FIG. 14.

Furthermore, operation 1606 includes determining first and second updated positions of the array of readers relative to the updated shingled tracks. As described above, it is preferred that the first and/or second updated positions are above and/or beyond the track edges of the updated shingled tracks. Accordingly, the track area positioned between each respective pair of first and second positions may include at least a majority of the width of the updated shingled track.

Method 1600 additionally includes repositioning the array of readers between the first and second updated positions and reading data from the updated shingled tracks (see operation 1608) and determining an updated read offset point where read performance is about the highest during the reading performed when repositioning the array of readers between the first and second updated positions. See operation 1610. It should be noted that operations 1606 and/or 1608 and/or 1610 may be performed using any one or more of the processes described above with reference to operations 1304, 1306 and 1308 of FIG. 13A, respectively.

With continued reference to FIG. 16, operation 1612 includes determining whether the updated read offset point is about aligned in a cross track direction with the nominal reading position. In other words, operation 1612 verifies that the updated read offset is now approximately zero, e.g., in a manner similar to that determined in operation 1308 above. For example, verifying the updated read offset may be performed by selectively positioning the array of readers over the shingled data tracks and attempting to read data therefrom. Specifically, the read offset point may be determined by repositioning the array of readers between the first and second positions of the shingled data tracks while reading, or attempting to read, data from the shingled tracks, e.g., see FIGS. 15A and 15B above. Thus, a verification process may be successfully performed as a result of operation 1612 determining that the updated read offset is at, or close to, zero.

Figure 17:
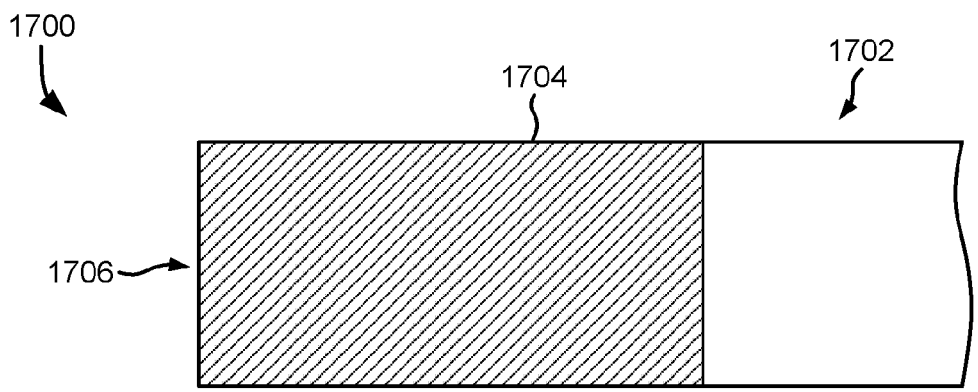
FIG. 17 is a representational diagram of a product having a reserved region.

Although the various processes described herein may be implemented with a variety of magnetic media types, particularly a variety of magnetic recording tape types, FIG. 17 illustrates a representational view of a preferred product to be implemented with the various processes described herein.

Looking now to FIG. 17, the representation of the product 1700 includes a linear magnetic recording medium 1702, e.g., such as a magnetic recording tape. Moreover, the linear magnetic recording medium 1702 includes a reserved region 1704 (e.g., calibration region) near a first end 1706 of the linear magnetic recording medium 1702.

The reserved region 1704 may be configured to receive shingled tracks usable for determining a lateral writing position to use while writing shingled tracks to the remainder of the linear magnetic recording medium 1702. It follows that the reserved region 1704 may be used to enact any one or more of the operations described above with reference to the various methods. Thus, the product 1700 may desirably be utilized such that shingled tracks are written to the reserved region 1704, e.g., in order to determine data describing a lateral writing position to use during writing such that shingled tracks may be written to a remainder of the linear magnetic recording medium 1702 in a location specified by a format. Accordingly, the reserved region 1704 may be used to perform one or more operations to determine a read offset point (e.g., due to the side-writing effect) and/or data describing a lateral writing position to use during writing such that shingled tracks are written in a location specified by a format, apply the read offset point and/or data describing a lateral writing position, and validate the determined information.

As shown in FIG. 17, the reserved region 1704 may be located towards the beginning of a tape. Moreover, the reserved region 1704 may be from about 1 to about 50 meters in length, e.g., depending on the overall length of the tape, the amount of anticipated use of the reserved region, etc., but could be longer or shorter depending on the desired embodiment. The reserved region 1704 may include are for writes in both directions. The product 1700 may indicate the presence and/or extents of the reserved region 1704 in memory, using header information, etc. Moreover, it is desirable that no customer data may be written to, or exist on the reserved region 1704. As a result, operations may be repeatedly performed in the reserved region 1704 without overwriting user data, or otherwise affecting the remainder of the data and/or unused tracks on the medium 1702. This also allows for the reserved region 1704 to be used to determine data describing a lateral writing position to use during writing such that shingled tracks are written in a location specified by a format at a point of manufacture, in the field by a user, upon being returned for repairs, etc.

It follows that, although the various processes described herein are preferably performed at a point of manufacture, any one or more of the processes may be performed in the field as necessary, e.g., on drives that are already installed in a customer environment, returned for repairs, etc.

Exemplary Embodiments

FIG. 18 illustrates a flowchart of a method 1800 according to an exemplary embodiment, which is in no way intended to limit the invention. The method 1800 may be performed in accordance with the present invention in any of the environments depicted in FIGS. 1-7, among others, in various embodiments. Of course, more or less operations than those specifically described in FIG. 18 may be included in method 1800, as would be understood by one of skill in the art upon reading the present descriptions.

Each of the steps of the method 1800 may be performed by any suitable component of the operating environment. For example, in various embodiments, the method 1800 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1800. Illustrative processors include, but are not limited to, a CPU, an ASIC, a FPGA, etc., combinations thereof, or any other suitable computing device known in the art.

As shown in FIG. 18, method 1800 may be used to perform shingled track preparation by first erasing all tracks associated with wrap N−2 of a calibration region (e.g., reserved region 1704). See operation 1802. Additionally, operation 1804 includes writing a data pattern to all tracks associated with wrap N of the calibration region, while operation 1806 includes erasing all tracks associated with wrap N+2 of the calibration region.

Method 1800 additionally includes positioning an array of readers at expected centers (such that a read offset is 0) of the tracks associated with wrap N of the calibration region, and reading data from the tracks associated with wrap N. See operation 1808. While reading data from the tracks associated with wrap N, error rate information may be gathered and/or analyzed. Thus, looking to operation 1810, an MSE value may be averaged over all tracks of wrap N.

Moreover, decision 1812 determines whether the average (Ave) MSE value qualifies as a new minimum value. Accordingly, decision 1812 may compare average MSE values determined in operation 1810 with a minimum value stored in memory. In response to determining that the average MSE value qualifies as a new minimum MSE value, method 1800 proceeds to operation 1814 where the average MSE value is stored as the new minimum MSE value. Moreover, upon performing operation 1814, method 1800 may proceed to operation 1820 which includes incrementing (e.g., stepping) a position of a head having the array of writers in the first cross track direction as described below.

However, returning to decision 1812, in response to determining that the average MSE value does not qualify as a new minimum MSE value, method 1800 proceeds to decision 1816 which determines whether the average MSE value is 150% of the minimum MSE value stored in memory. As previously mentioned, an array of readers may be repositioned to various locations along a first cross track direction in large steps until a threshold (e.g., about 150% higher than the lowest observed MSE value) has been reached. Upon reaching the threshold (here 150% of the minimum MSE value stored in memory), it may be determined that about an outer extent of the data track along the first cross track direction has been reached.

Thus, referring again to decision 1816, the average MSE value is stored as a maximum position in response to determining that the average MSE value is 150% of the minimum MSE value stored in memory. See operation 1818. However, method 1800 may proceed to operation 1820 in response to determining that the average MSE value is less than 150% of the minimum MSE value stored in memory. As shown, operation 1820 includes incrementing (e.g., stepping) a position of a head having the array of writers in the first cross track direction. Moreover, method 1800 may return to operation 1810 in response to completing the incrementing of operation 1820.

Once the maximum position has been determined in operation 1818, method 1800 may proceed to operation 1822 where the average MSE value is again determined over all tracks associated with wrap N. Decision 1824 includes determining whether the average MSE value qualifies as a new minimum value, e.g., similar to decision 1812 above. Thus, in response to determining that the average MSE value qualifies as a new minimum MSE value, method 1800 proceeds to operation 1826 where the average MSE value is stored as the new minimum MSE value, after which method 1800 proceeds to operation 1830 which includes incrementing (e.g., stepping) a position of the head in a second cross track direction opposite the first cross track direction.

However, returning to decision 1824, in response to determining that the average MSE value does not qualify as a new minimum MSE value, method 1800 proceeds to decision 1828 which determines whether the average MSE value is 150% of the minimum MSE value stored in memory. Method 1800 may proceed to operation 1830 in response to determining that the average MSE value is less than 150% of the minimum MSE value stored in memory. As mentioned above, operation 1830 includes incrementing (e.g., stepping) a position of the head in a second cross track direction opposite the first cross track direction. Moreover, method 1800 may return to operation 1822 in response to completing the incrementing of operation 1830.

However, referring again to decision 1828, the average MSE value is stored as a minimum position in response to determining that the average MSE value is 150% of the minimum MSE value stored in memory. See operation 1832.

Figure 19:
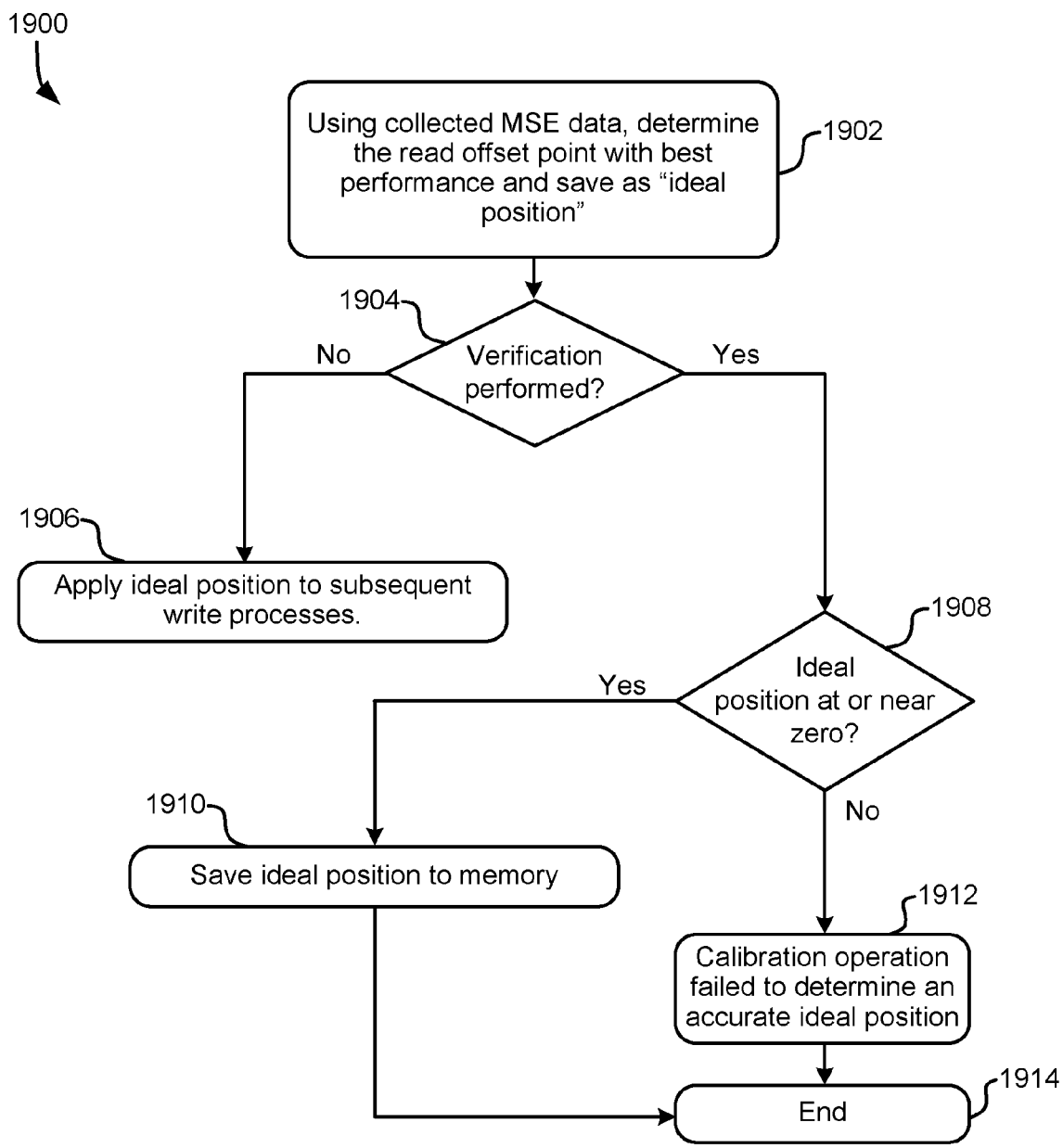
FIG. 19 is a flowchart of a method according to an exemplary embodiment.

Furthermore, FIG. 19 illustrates a flowchart of a method 1900 for determining a data describing a lateral writing position to use during writing according to an exemplary embodiment, which is in no way intended to limit the invention. The method 1900 may be performed in accordance with the present invention in any of the environments depicted in FIGS. 1-7, among others, in various embodiments. Of course, more or less operations than those specifically described in FIG. 19 may be included in method 1900, as would be understood by one of skill in the art upon reading the present descriptions.

Each of the steps of the method 1900 may be performed by any suitable component of the operating environment. For example, in various embodiments, the method 1900 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1900. Illustrative processors include, but are not limited to, a CPU, an ASIC, a FPGA, etc., combinations thereof, or any other suitable computing device known in the art.

As shown in FIG. 19, method 1900 includes using MSE data to determine a read offset point where read performance is about the highest, e.g., as exemplified by a lowest MSE value, and saving that read offset point as an "ideal position". See operation 1902. Moreover, decision 1904 determines whether a verification process has already been applied to determine whether the "ideal position" produces desired results upon being implemented. When decision 1904 determines that a verification process has not been applied, method 1900 proceeds to operation 1906 where the ideal position is applied to subsequent write processes and a verification process (e.g., see FIG. 16) is applied. As a result, shingled data tracks may be written in a location specified by a format.

Referring again to decision 1904, method 1900 proceeds to decision 1908 in response to determining that a verification process has already been performed. Decision 1908 includes determining whether the ideal position determined in operation 1902 is at, or near a zero offset from a nominal reading position, e.g., by analyzing the data gleaned from the verification process. When it is determined that the ideal position is at, or near a zero offset from a nominal reading position, method 1900 proceeds to operation 1910 where the ideal position is saved to memory and preferably applied during subsequent write operations. Moreover, upon completing operation 1910, method 1900 proceeds to operation 1914 and is ended.

However, when decision 1908 determines that the ideal position is not at, or not near a zero offset from a nominal reading position, method 1900 proceeds to operation 1912 where it may be determined that the calibration operation failed to determine an accurate ideal position, offset changes may be discarded, and method 1900 is ended. See operation 1914.

Again, it should be noted that the exemplary embodiments illustrated in FIGS. 18-19 are in no way intended to limit the invention, but rather are presented by way of example only.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    writing a plurality of shingled tracks using an array of writers;
    repositioning an array of readers to various locations between first and second positions relative to the shingled tracks and reading data from the shingled tracks at the various locations;
    determining a read offset point where read performance is about the highest; and
    computing, using the read offset point, data describing a lateral writing position to use during writing.

2. The method as recited in claim 1, comprising determining the first and second positions relative to the shingled tracks by:
    positioning the array of readers at expected centers of the shingled tracks;
    repositioning the array of readers to various locations along a first cross track direction and reading data from the shingled tracks;
    selecting the first position of the array of readers as a maximum position based on an error rate during the reading;
    repositioning the array of readers to various locations along a second cross track direction opposite the first cross track direction and reading data from the shingled tracks; and
    selecting the second position of the array of readers as a minimum position based on the error rate during the reading.

3. The method as recited in claim 1, wherein the method is performed in less than two minutes.

4. The method as recited in claim 1, comprising:
    repositioning the array of writers from a nominal writing position to the lateral writing position;
    writing a plurality of updated shingled tracks at the lateral writing position using the array of writers;
    determining first and second updated positions of the array of readers relative to the updated shingled tracks, the first and second updated positions being above and/or beyond track edges of the updated shingled tracks;
    repositioning the array of readers between the first and second updated positions and reading data from the updated shingled tracks;
    determining an updated read offset point where read performance is about the highest during the reading performed when repositioning the array of readers between the first and second updated positions; and
    determining whether the updated read offset point is about aligned in a cross track direction with a nominal reading position.

5. The method as recited in claim 1, wherein the data includes a lateral offset from a nominal writing position.

6. The method as recited in claim 1, wherein the array of readers is positioned on a drive, the drive also having the array of writers.

7. The method as recited in claim 1, wherein the array of readers is positioned on a different drive than a drive having the array of writers.

8. The method as recited in claim 7, wherein the different drive is a calibrated drive.

9. The method as recited in claim 1, comprising determining the first and second updated positions relative to the shingled tracks, wherein the first and second positions of the array of readers relative to the shingled tracks are determined by imaging magnetic domains of the plurality of shingled tracks written by the array of writers.

10. The method as recited in claim 1, comprising determining the first and second positions relative to the shingled tracks using physical characteristics of magnetic poles of the writers in the array of writers.

11. The method as recited in claim 1, comprising applying the data describing the lateral writing position during subsequent shingled writing.

12. An apparatus, comprising:
    a drive mechanism for passing a magnetic medium over the array of writers;
    a controller electrically coupled to the array of writers; and
    logic integrated with and/or executable by the controller to perform the method of claim 1.

13. A computer program product, the computer program product comprising a computer readable storage medium having program instructions embodied therewith, wherein the computer readable storage medium is not a transitory signal per se, the program instructions executable by a data storage device to cause the data storage device to perform a method comprising:
    writing, by the data storage device, a plurality of shingled tracks using an array of writers;
    repositioning, by the data storage device, an array of readers to various locations between first and second positions relative to the shingled tracks and reading data from the shingled tracks at the various locations;
    determining, by the data storage device, a read offset point where read performance is about the highest; and
    computing, by the data storage device using the read offset point, data describing a lateral writing position to use during writing.

14. The computer program product as recited in claim 13, comprising program instructions for applying the data describing the lateral writing position during subsequent shingled writing.

15. A magnetic recording product for storing data, comprising:

a linear magnetic recording medium; and a reserved region on the magnetic recording medium, the reserved region being configured to receive shingled tracks usable for determining a lateral writing position to use during writing such that shingled tracks are written in a location specified by a format.

16. The magnetic recording product as recited in claim 15, comprising the shingled tracks in the reserved region.

17. The magnetic recording product as recited in claim 15, comprising shingled data tracks outside the reserved region.

18. The magnetic recording product as recited in claim 15, comprising an indication of the presence of the reserved region, the indication being stored on the magnetic recording product.

\* \* \* \* \*